(12) United States Patent
Pelikan et al.

(10) Patent No.: US 7,047,169 B2
(45) Date of Patent: May 16, 2006

(54) METHOD FOR OPTIMIZING A SOLUTION SET

(75) Inventors: Martin Pelikan, Champaign, IL (US); David E. Goldberg, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 879 days.

(21) Appl. No.: 10/051,317

(22) Filed: Jan. 18, 2002

(65) Prior Publication Data

US 2003/0055614 A1 Mar. 20, 2003

Related U.S. Application Data

(60) Provisional application No. 60/262,756, filed on Jan. 18, 2001.

(51) Int. Cl.
 *G06F 17/10* (2006.01)
(52) U.S. Cl. ............................................. 703/2; 700/28
(58) Field of Classification Search .................... 703/2; 700/28, FOR. 102; 705/7
See application file for complete search history.

(56) References Cited

U.S. PATENT DOCUMENTS

| | | | | |
|---|---|---|---|---|
| 5,930,762 | A | * | 7/1999 | Masch ............................ 705/7 |
| 5,940,816 | A | * | 8/1999 | Fuhrer et al. .................. 706/13 |
| 5,963,902 | A | * | 10/1999 | Wang ........................... 704/243 |
| 6,490,572 | B1 | * | 12/2002 | Akkiraju et al. ............... 706/19 |
| 6,615,205 | B1 | * | 9/2003 | Cereghini et al. ............. 707/3 |
| 6,768,973 | B1 | * | 7/2004 | Patel ............................ 703/2 |

OTHER PUBLICATIONS

Samir W. Mahfoud, *Niching Methods for Genetic Algorithms, Thesis*, University of Illinois at Urbana-Champaign, 1995.

David Heckerman, Dan Geiger, David M. Chickering, *Learning Bayesian Networks: The Combination of Knowledge and Statistical Data, Technical Report MSR-TR-94-09*, Microsoft Corporation, Redmond, WA, Mar. 1994 (Revised Feb. 1995).

Georges Harik, *Finding Multiple Solutions In Problems of Bounded Difficulty*, IlliGAL Report No. 94002, May 1994.

Shumeet Baluja, *Population-Based Incremental Learning: A Method for Integrating Genetic Search Based Function Optimization and Competitive Learning*, CMU-CS-94-163, Carnegie Mellon University, Jun. 2, 1994.

(Continued)

*Primary Examiner*—Albert W. Paladini
(74) *Attorney, Agent, or Firm*—Greer, Burns & Crain, Ltd.

(57) ABSTRACT

An embodiment of a method for optimizing a solution set has steps of generating a first solution set, selecting a second solution set from the first, fitting the second solution set with a probabilistic model, using the model to generate a new set of solutions, replacing at least a portion of the first set of solutions with the third, and evaluating the third set to determine if completion criteria have been met. A probabilistic model may allow for merging a plurality of variables into a single variable and for modeling relationships between the merged variables over multiple hierarchical levels. Invention method embodiments may also comprise steps of niching to preserve diversity among the solution set.

46 Claims, 7 Drawing Sheets

OTHER PUBLICATIONS

David Maxwell Chickering, David Heckerman, *Efficient Approximations for the Marginal Likelihood of Bayesian Networks with Hidden Variables, Technical Report MSR-TR-96-08*, Microsoft Corporation, Redmond, WA, Mar. 1996 (Revised Apr. 1997).

Georges R. Harik, Fernando G. Lobo, David E. Goldberg, *The Compact Genetic Algorithm, IlliGAL Report No. 97006*, University of Illinois at Urbana-Champaign, Aug. 1997.

Jeremy S. De Bonet, Charles L. Isbell, Jr., Paul Viola, *MIMIC: Finding Optima by Estimating Probability Densities, Advances in Neural Information Processing Systems*, MIT Press, Cambridge, MA, 1997.

David E. Goldberg, *The Race, the Hurdle, and the Sweet Spot: Lessons from Genetic Algorithms for the Automation of Design Innovation and Creativity, IlliGAL Report No. 98007*, University of Illinois at Urbana-Champaign, Apr. 1998.

Martin Pelikan, David E. Goldberg, and Erick Cantú-Paz, *Linkage Problem, Distribution Estimation, and Bayesian Networks, IlliGAL Report No. 98013*, University of Illinois at Urbana-Champaign, Nov. 1998.

Martin Pelikan, David E. Goldberg, and Erick Cantú-Paz, *BOA: The Bayesian Optimization Algorithm, IlliGAL Report No. 99003*, University of Illinois at Urbana-Champaign, Jan. 1999.

Georges Harik, *Linkage Learning via Probabilistic Modeling in the ECGA, IlliGAL Technical Report 99010*, Illinois Genetic Algorithms Laboratory, Urbana, IL, Jan. 1999.

Martin Pelikan, David E. Goldberg, and Fernando Lobo, *A Survey of Optimization by Building and Using Probabilistic Models, IlliGAL Report No. 99018*, University of Illinois at Urbana-Champaign, Sep. 1999.

Martin Pelikan and David E. Goldberg, *Hierarchical Problem Solving by the Bayesian Optimization Algorithm, IlliGAL Report No. 2000002*, University of Illinois at Urbana-Champaign, Jan. 2000.

Martin Pelikan and David E. Goldberg, *Genetic Algorithms, Clustering, and the Breaking of Symmetry, IlliGAL Report No. 2000013*, University of Illinois at Urbana-Champaign, Mar. 2000.

Martin Pelikan, David E. Goldberg, and Kumara Sastry, *Bayesian Optimization Algorithm, Decision Graphs, and Occam's Razor, IlliGAL Report No. 2000020*, University of Illinois at Urbana-Champaign, May 2000.

Martin Pelikan and David E. Goldberg, *Escaping Hierarchical Traps with Competent Genetic Algorithms, IlliGAL Report No. 2001003*, University of Illinois at Urbana-Champaign, Jan. 2001.

Richard A. Watson, *Analysis of Recombinative Algorithms on a Non-separable Building-block Problem*, Dynamical & Evolutionary Machine Organization, Volen Center for Complex Systems, Brandeis University, Waltham, MA, 2000.

Richard A. Watson, Gregory S. Hornby, and Jordan B. Pollack, *Modeling Building-Block Interdependency*, Dynamical & Evolutionary Machine Organization, Volen Center for Complex Systems, Brandeis University, Waltham, MA, 1998.

Peter A.N. Bosman and Dirk Thierens, *Continuous Iterated Density Estimation Evolutionary Algorithms Within the IDEA Framework*, Department of Computer Science, Utrecht University, The Netherlands, 2000.

Heinz Mühlenbein and Thilo Mahnig, *FDA—A Scalable Evolutionary Algorithm for the Optimization of Additively Decomposed Functions*, Theoretical Foundation GMB Lab, Real World Computing Partnership, GMB FZ Informationstechnik, Augustin, 1999.

Heinz Mühlenbein, Thilo Mahnig and Alberto Ocho Rodriguez, *Schemata Distributions and Graphical Models in Evolutionary Optimization, Journal of Heuristics*, 5 pp. 215-247, 1999.

H. Mühlenbein and G. PaaB, *From Recombination of Genes to the Estimation of Distributions I. Binary Parameters*, GMD—Forschungszentrum Informationstechnik, Germany (believed published circa 1998).

Samir W. Mahfoud, *A Comparison of Parallel and Sequential Niching Methods, Proceedings of the Sixth International Conference on Genetic Algorithms*, 136-143, 1995.

Nir Friedman and Moises Goldszmidt, *Learning Bayesian Networks with Local Structure*, 1999.

Ramon Etxeberria and Pedro Larrañaga, *Global Optimization Using Bayesian Networks*, (believed published circa 2000).

Scott Davies and Andrew Moore, *Bayesian Networks for Lossless Dataset Compression*, (believed published circa 2000).

Goldberg, D. E., "Genetic Algorithms in Search, Optimization & Machine Learning," Addison Wesley Longman, Inc., 1989.

Goldberg, D. E., "The Design Of Innovation: Lessons from and for Competent Genetic Algorithms," Kluwer Academic Publishers, 2002.

* cited by examiner

METHOD FOR OPTIMIZING A SOLUTION SET

CROSS REFERENCE

The present application claims priority on U.S. Provisional application No. 60/262,756 filed on Jan. 18, 2001, now abandoned.

STATEMENT OF GOVERNMENT INTEREST

This invention was made with government assistance from the Air Force Office of Scientific Research, Air Force Material Command, U.S.A.F., under grants number F49620-97-0050, number F49620-00-1-0163; and from the National Science Foundation under grant number DMI-9908252; and from the U.S. Army Research Laboratory under the Federal Laboratory Program, Cooperative Agreement number DAAL 01-96-2-0003. The government has certain rights in this invention.

FIELD OF THE INVENTION

The present invention is related to methods for optimizing solution sets.

BACKGROUND OF INVENTION

Many real-world optimization problems have enormously large potential solution sets. Random searching or enumeration of the entire search space of such sets is not practical. As a result, efforts have been made to develop optimization methods for solving the problems efficiently. To date, however, known optimization methods have substantial limitations.

One class of optimization methods that have shown some promise is the so-called genetic optimization method or algorithm. This method evolves a population of potential solutions to a given problem. Genetic optimization methods are described in detail in "Adaptation in natural and artificial systems," J. Holland, University of Michigan Press, Ann Arbor Mich. (1975), and "Genetic Algorithms in search, optimization, and machine learning," D. Goldberg, Addison-Wesley publishing, Reading Mass. (1989), both of which are incorporated herein by reference. Genetic optimization methods are generally useful for manipulating a large number of promising partial solutions. The first population of solutions may be generated at random. By means of a measure of quality of solutions, usually expressed in the form of one or multiple functions, better solutions are selected from the first population. The selected solutions undergo the operators of selection, mutation and crossover in order to create a second population of new solutions (the offspring population) that fully or in part replace the original (parent) population. The process repeats until the termination criteria (e.g., convergence to a singleton) are met.

While genetic optimization methods may be useful for application to some problems, they have proven less useful for others. Many real-world problems, for example, can be decomposed into sub-problems of less difficulty and solved quickly, accurately, and reliably, by propagating and combining partial solutions corresponding to the different sub-problems with operators of genetic optimization methods. The application of traditional genetic optimization methods to decomposable problems, however, has met with limited success.

Traditional genetic optimization methods have been impractical for use with decomposable problems, and particularly for complex decomposable problems, for a number of reasons. For example, conventional genetic optimization methods are not capable of "learning" how to properly combine sub-solutions via crossover, and they do not feature cross-over that is expressive enough to apply to the decomposed problem. Decomposition is generally expressed on a single level only, with crossover operating only on very near neighbors thereby limiting its usefulness.

As a result, traditional optimization methods application to decomposable problems has typically required accurate and detailed design of the problem decomposition before application of the method. High levels of effort are therefore required for solution design, adding cost and time to the solution. Further, error rates remain high when sufficient information is not available to encode the problem decomposition. These disadvantages are particularly acute when addressing problems of appreciable difficulty and/or complexity, such as hierarchically decomposable problems where dependencies, independencies, and other relationships may exist across multiple levels. For more information regarding the class of problems categorized as hierarchical, reference is made to "Sciences of the Artificial," by Herbert Simon, The MIT Press, Cambridge, Mass. (1981); herein incorporated by reference.

As a result of these disadvantages, methods have been proposed to limit the need to precisely pre-code the problem decomposition. In particular, efforts have been made to develop genetic optimization methods that "learn" a problem as it is encountered through "linkage learning"—discovery of relationships between variables. A few classes of such methods have been proposed. One approach is based on introducing additional operators into the genetic optimization method to evolve representation of the solutions in addition to the solutions themselves. This practice has met with limited success. Among other difficulties, it has been discovered that in such methods the influence driving the optimization to accomplishing good representation is of much lower magnitude than the influence driving the optimization to seeking high-quality solutions. Consequently, premature convergence may occur before a proper representation of the global optimum is learned.

A second proposed approach is based on performing perturbations to a single position or multiple positions and recording the statistics of the resulting change in the quality of each solution. The gathered information is then analyzed to create groups of variables that seem to be correlated. Crossover is modified to agree with the discovered relationships. Among other problems, however, these methods tend to be inefficient due to the number of perturbations required. Cost and required run times are thereby increased.

A third approach is based on probabilistic model building during genetic optimization to learn the problem structure. An example of such a proposed method is the so-called Bayesian optimization method or algorithm. The Bayesian optimization method is described in detail in "Linkage problem, distribution estimation, and Bayesian networks," by Pelikan, Goldberg, and Cantu-Paz, IlliGAL Report No. 98013, Urbana Ill., University of Illinois at Urbana-Champaign, Illinois Genetic Algorithms Laboratory (1998) ("the Pelikan reference"), incorporated herein by reference. The psuedo-code of the Bayesian optimization method is:

1) An initial solution set is generated at random.
2) A promising set of solutions is then selected from the initial solution set.

3) A Bayesian network is then constructed to model the promising solutions and subsequently guide the further search.
4) A metric as a measure of quality of networks and a search algorithm can be used to search over the networks in order to maximize/minimize the value of the used metric.
5) New strings are generated according to the joint distribution encoded by the constructed network.
6) The new strings are added into the old population, replacing some of the old ones.
7) If completion criteria are not met, the process repeats itself using the partially replaced initial population.

While these proposed methods may offer some advantage over previous methods, many disadvantages with known methods remain. For example, known methods such as the Bayesian optimization method tend to be limited in their ability to learn the problem structure at hand. The learning of the problem, in fact, is often limited to learning relationships that exist only on a single level. Thus, while such methods may be useful for solving relatively simple problems that can be described by relations on a single level, they have proven much less practical for more complex problems with an example being hierarchically decomposable functions of appreciable complexity. For such problems, known methods such as the Bayesian optimization do not scale up well, may converge too early or too late, may converge at less than an optimal solution set, and/or may crash.

In addition, known methods such as the Bayesian optimization method are disadvantageous in their inability to determine multiple solutions to a problem, or to address problems that have symmetry in their solutions. Indeed, by their genetic and evolutionary nature, most known optimization methods tend to focus on one promising solution above all others and continue to evolve it. Such tendencies are disadvantageous when addressing problems having multiple solutions that are difficult to accurately differentiate using only a fitness function. Further, for complex problems that may be decomposed on multiple levels, it may not be possible to determine which of a variety of sub-problem solutions are preferable until a higher level solution is investigated. In such cases, most known optimization methods are inadequate. Such problems are particularly acute for problems that have symmetry or multiple optima, when known methods such as the Bayesian method will tend to eliminate all but a single search area early in the iterative solution process.

Unresolved problems in the art therefore exist.

SUMMARY OF THE INVENTION

Embodiments of the present invention are directed to methods and program products for optimizing a solution set for a problem defined over discrete variables. The iterative process of invention embodiments operates on a population of candidate solutions to the problem until termination criteria are satisfied. Embodiments of the present invention comprise steps of generating a first set of solutions, selecting a second set form the first, fitting the second set with a probabilistic model that provides for "chunking" whereby a plurality of variables may be merged into a single variable, using the model to generate a third set of solutions, and replacing at least a portion of the first set with the third set. Other embodiments of the invention comprise steps of generating a first set of solutions, selecting a second set form the first, fitting the second set with a probabilistic model, using the model to generate a third set of solutions, niching to preserve diversity among the solutions, and replacing at least a portion of the first set with the third set.

Those knowledgeable in the art will appreciate that embodiments of the present invention lend themselves well to practice in the form of computer program products. Accordingly, it will appreciated that embodiments of the invention may comprise computer program products comprising computer executable instructions stored on a computer readable medium that when executed cause a computer to undertake certain steps. It will further be appreciated that the steps undertaken may comprise method embodiment steps, and in this sense that description made herein in regards to method embodiments likewise applies to steps undertaken by a computer as a result of execution of a computer program product embodiment of the invention.

Embodiments of the present invention solve many otherwise unresolved problems in the art. For example, invention embodiments have shown to scale up very well for solving complex problems that may be decomposed in a hierarchical fashion over multiple levels. Steps of creating models that allow for merging a plurality of variables into a single variable allow for hierarchal relationships to be effectively modeled, so that solutions to sub-problems on a lower level can be efficiently represented on higher levels. Also, embodiments of the invention are able to preserve diversity of the solution set so that alternative solutions may be evaluated, and so that problems having an element of symmetry in their solution may be addressed.

The above discussion sets forth broadly some features and benefits of the present invention that will be better understood and appreciated through consideration of the following discussion of detailed invention embodiments.

DETAILED DESCRIPTION

Figure 1:
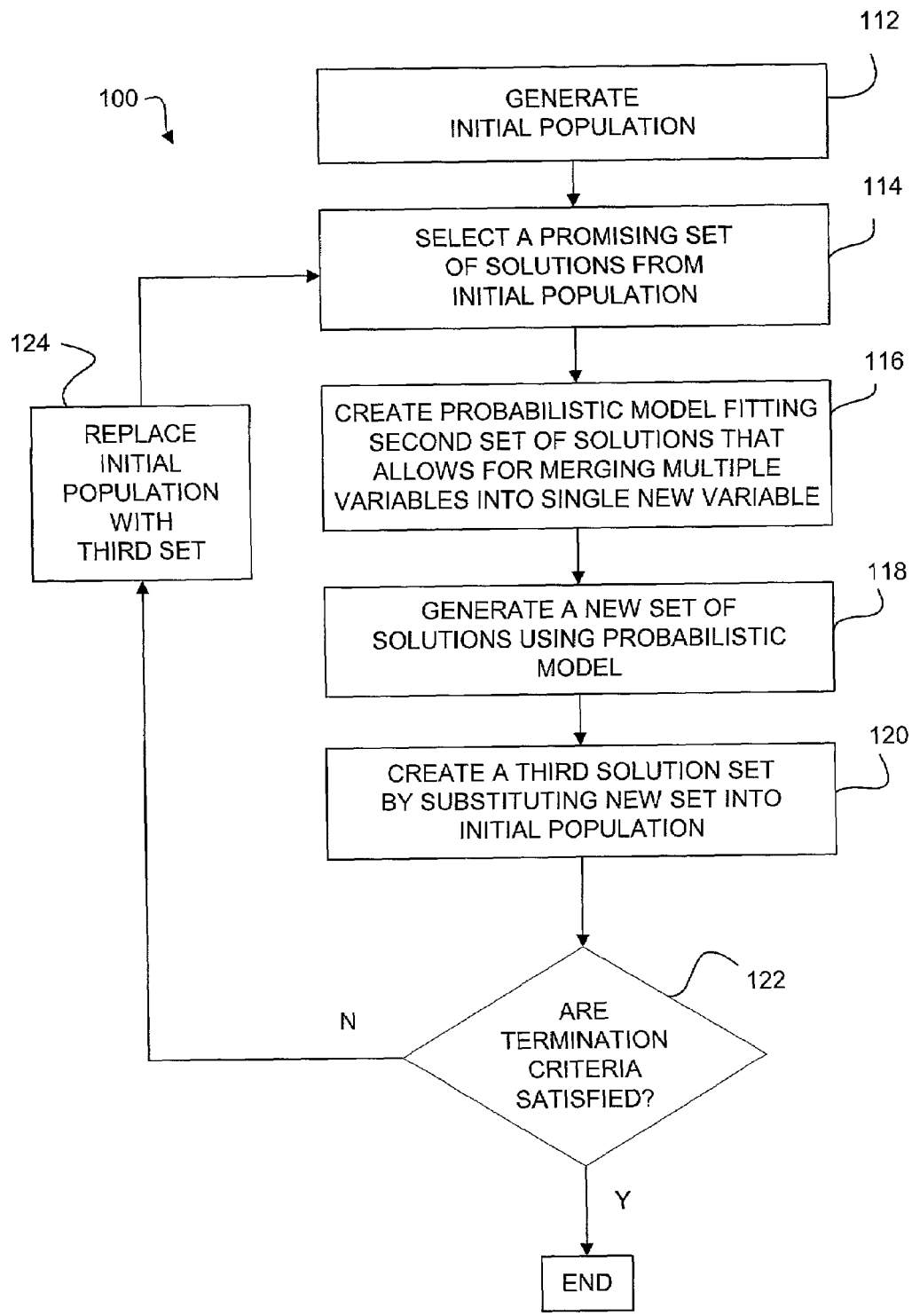
FIG. 1 is a flowchart illustrating the general steps of one example embodiment of the invention that comprises steps of performing chunking.

FIG. 1 illustrates one example embodiment 100 of a method of the invention. In considering this and other embodiments of the invention, it will be appreciated that some of the steps of embodiments of the invention are similar to some steps of a Bayesian optimization method. As these steps are generally known by those skilled in the art, great detail regarding their performance is unnecessary for discussion herein. Additional detail regarding these steps is available by reference to available publications, with an example being the Pelikan reference.

The embodiment 100 comprises generating a first set of solutions (block 112). The solution set may comprise, by way of example, a plurality of members, with each member being a binary character string of fixed or variable length. It will be appreciated that the individual members may likewise comprise any of a number of formats, with examples including, but not limited to, k-ary strings of fixed/variable length, integer vectors of fixed/variable length, real vectors of fixed/variable length, permutations, trees/networks/graphs, random keys, program codes, text, images, production rules, logical expressions, floating point code, alphanumeric code, combinations of any of these elements, and the like. Further, virtually any imaginable type of individual member may be converted to a format such as a fixed/variable length n-ary string for use with an invention embodiment.

The first set of solutions may be generated, by way of example, randomly. By way of additional examples, the first solution set may be generated according to a uniform distribution, or according to a distribution that is biased according to some expert or prior knowledge of the problem at hand. By way of still further example, the first population set may be the result of some previous processing, such as a search or optimization.

The embodiment 110 further comprises a step of using a selection operator to select preferred members from the first solution set to create a second solution set (block 114). Any suitable selection operator may be used, with examples comprising tournament selection, truncation selection, fitness proportionate selection, and Boltzmann selection. The selection operator may comprise, by way of particular example, a fitness function that measures the fitness of each of the members of the first set and selects only members having a high fitness to create the second set. By way of more particular example, each of the members of the first solution set may be evaluated according to the solved problem, with each candidate solution assigned a value (e.g., a fitness value) or a set of values related to the performance of the candidate solution with respect to the objective (or objectives). The selection operator uses the assigned values to create a new population of candidate solutions containing more copies of candidate solutions having better performance. Embodiments of the present invention will be useful using any selection operator that are commonly known for use in genetic and other evolutionary optimization methods.

Those knowledgeable in the art will appreciate that there are a number of particular fitness functions that may be appropriate for practice with the invention. By way of example and not limitation, embodiment steps may comprise use of: co-evolved fitness (solutions compete between each other in tournaments), multiobjective fitness (including multiple objectives to find a tradeoff), multimodal fitness (including multiple optima/attractors), interactive fitness (evaluated with help of a human), approximate fitness (approximated according to the history of the run, inherited, or acquired by a model of the problem), simulation (simulation of a system), execution (execution of a solution in a computer or other system), computation on an analog computer, and direct computation or testing on or of a prototype of the system being optimized.

Some invention embodiments may comprise steps of using a selection operator that performs niching to preserve diversity among the second solution set. The purpose of niching in genetic and evolutionary optimization is twofold: (1) discovery of multiple solutions of the problem and (2) preservation of alternative solutions until it can be decided which solution is better. In some real-world applications it is desirable to find multiple solutions and let the expert or experiment decide which of the solutions is the best after all. This may be the case, for instance, when the fitness function does not fully determine which solution is the best in practice but instead only focuses on several aspects of solution quality, or when for the sake of efficiency instead of using a complete fitness function only its approximation is used that is more computationally efficient.

One reason for preserving multiple alternative solutions is that on some difficult problems it cannot be clearly determined which alternative solutions are really on the right track until the optimization proceeds for a number of generations. Without niching the population is subject to genetic drift that may destroy some alternatives before we find out whether or not they are the ones we are looking for.

In a general sense, selection operators that perform niching to preserve diversity modify the selection so that similar candidate solutions compete with each other for the resources (space in the population) more often than the distant solutions. That is, niching methods localize competition in some way. Niching becomes an important issue when considering hierarchically decomposable problems and sub-problem solutions from one level are to be considered for solving higher level problems. In such circumstances, it is important to have a meaningful diversity of sub-problem solutions to choose from.

There are at least three general approaches to niching. One approach modifies the fitness landscape before the selection is performed. The second approach modifies the selection itself to take into account the fitness as well as the genotype or the phenotype instead of using the fitness as the only criterion. Both approaches allow solutions that share many similarities to compete for common resources. Crowding, restricted mating, and fitness sharing are based on this idea. The third approach is based in general on "spatial separation," and may entail, for example, isolating several groups of individuals for subsequent processing rather than keeping the entire population in one location. The individuals can migrate between different locations (islands or demes) at certain intervals and allow the population at each location develops in isolation.

Different embodiments of the invention may be practical using selection operators that comprise a niching technique based on any of these three approaches, as well as other known niching methods. Also, it will of course be appreciated that selection operators are not required to perform niching. Some example selection operators suitable for use in invention embodiments comprise a tournament selection operator, a truncation selection operator, a fitness selection operator, a pre-selection operator, a crowding selection operator, a clustering selection operator, and a Boltzmann selection operator.

In crowding, for each new individual a subset of the population is first selected. The new individual then replaces the most similar individual in this subset. Earlier in the run only little will change compared to a random replacement. However, as the run continues, the individuals will create groups of similar individuals who compete for space with other members of the same group.

In fitness sharing, the quality of each candidate solution is adjusted to account for the number of similar candidate solutions via the so-called sharing function. The goal of fitness sharing is to ensure that the number of individuals that are very similar is proportional to the numerical value of their quality. Those knowledgeable in the art will appreciate that fitness sharing tends to be fairly stable, and capable of preserving multiple optima over many iterations. One drawback of fitness sharing selection operators is that they may experience difficulty in maintaining optima that are close to one another. Also, it is difficult to estimate the number of niches. Also, it is noteworthy that fitness sharing directly changes the fitness values used for selection, and thereby may have some significant effects on the optimization.

Restricted tournament selection selects parents at random with a uniform distribution. After performing crossover, a subset of the population is selected for each parent, similarly as in crowding. However, instead of automatically replacing the closest individual, the two individuals compete and the one that has a higher fitness wins. In this manner, the selection step is performed by elitist replacement with a flavor very similar to crowding. No extra selection operator is required. It has been shown that restricted tournament selection performs very well on a number of multimodal problems and is able to locate all optima even on functions that are highly multimodal and very difficult to solve.

Clustering is an example of the third approach to niching, based on spatial separation. There are at least two reasons why spatial separation is desirable in genetic and evolutionary computation. One is that in nature the populations are actually divided into a number of subpopulations that (genetically) interact only rarely or do not interact at all. The second is that separating a number of subpopulations allows an effective parallel implementation and is therefore interesting from the point of view of computational efficiency. Spatial separation localizes competition by introducing some sort of geographical location of each individual. Unlike in fitness sharing, in spatial separation the location of each individual does not depend on its genotype or phenotype. The amount of information exchange between groups of individuals from different locations is controlled by some strategy and may depend on the distance or the relationship between the locations.

Much work in spatial separation was inspired by the shifting balance theory, as discussed in "Evolution and the genetics of populations: a treatise,", by S. Wright, University of Chicago Press, Chicago, Ill. (1968), and the theory of punctuated equilibria, as discussed in "Punctuated equilibria: an alternative to phyletic gradualism," by N. Eldredge et al., Freeman & Co., San Francisco, Calif. (1972); both of which are incorporated by reference herein. One approach is to divide the population into a number of subpopulations. Each subpopulation evolves on its own island and individuals migrate between the islands at certain rate. In this way, the genetic material is exchanged within each of the subpopulations often while its flow to other subpopulations is reduced. Spatial separation methods may also involve steps of introducing some kind of distance metric in the population and force local competition and mating.

Embodiments of the present invention comprise steps of selection that perform spatial separation as a niching tool. In particular, embodiments of the present invention comprise steps of separating the selected second group of solutions into a plurality of groups or "clusters" for further individual processing, so that diversity of the solutions may be preserved. It has been discovered that invention embodiments that comprise steps of niching through spatial separation are of particular utility for solving particular classes of hierarchically decomposable problems that involve symmetry or other localized optima for searching. The use of spatial separation based niching for these problems will be discussed in detail in a subsequent section herein.

Those skilled in the art will appreciate that these and other selection operators for performing niching methods are generally known in the art. For additional detail regarding crowding, restricted tournament selection, and other selection operators that perform niching, many literature references are available. By way of example, reference is made to "Adaptive search using simulated evolution," Doctoral dissertation of D. J. Cavicchio, University of Michigan, Ann Arbor, Mich., University Microfilms No. 25-0199 (1970); "An analysis of the behavior of a class of genetic adaptive systems," Doctoral dissertation of K. A. De Jong, University of Michigan, Ann Arbor, Mich., University Microfilms No. 76-9381 (1975); "Crowding and preselection revisited," by S. W. Mahfoud, Parallel Problem Solving for Nature, 2, pp. 27–36, Elsevier Science (1992); "Linkage learning via probabilistic modeling in the ECGA," by G. Harik, IlliGAL Report No. 99010, University of Illinois at Urbana-Champaign, Illinois Genetic Algorithms Laboratory (1999); all of which are incorporated herein by reference.

It will also be understood that embodiments of the invention may comprise steps of performing niching that are separate from the steps of selection. Indeed, performing niching steps in a different sequence than has been discussed with reference to the embodiment 100 may be advantageous in some circumstances, as will be discussed herein, for example, with reference to the invention embodiment 300.

Referring once again to FIG. 1, regardless of the selection operator used, once the second solution set has been created, the embodiment 100 further comprises a step of fitting the second set of solutions with a probabilistic model (block 116). As will be understood by those skilled in the art, a probabilistic model is one that, for example, assigns a probability distribution to the members of the second set, and thereby is able to express a joint distribution between single variables. In order to be effective for solving complex hierarchical problems having multi-level dependencies, however, the embodiment 100 comprises using a probabilistic model that in addition to estimating a joint distribution between single variables, also allows multiple variables to be merged together to form a new variable. This variable may then be treated as a single unit. Relationships or "links" between these merged variables may also be modeled. In this fashion, the solutions of higher order can be formed by using groups or "chunks" of variables as basic building blocks (a practice that may be referred to as "chunking").

Indeed, an important advantage of embodiments of the present invention is the ability to be applied to hierarchical problems of appreciable complexity. This is advantageous in that many complex real world problems are decomposable in a hierarchical manner. In engineering design, for example, problems are often solved in a hierarchical fashion. New designs or ideas are composed of other designs or ideas without having to reinvent these. Many sub-parts of the new design can be created separately with the final result produced by combining the already designed alternatives.

For example, when designing a car, the car stereo and the engine can be designed separately and combined together to form a part of a new car design. Various alternatives can be tried and the final choice can be made by comparing different combinations of car stereos and engines. When designing an engine, there is no need to reinvent the carburetor; instead one can be chosen from a set of reasonable carburetors that have already been designed. When completing the design on a higher level, an appropriate engine may be combined with the remaining parts (e.g., the car stereo). To put all the parts together, it is not required to reinvent nuts and bolts each time some part of the engine is modified (e.g., change the size of cylinders). Instead, reasonable ones previously designed on a lower level may be used. In general, higher-level knowledge can be obtained at much lower price by approaching the problem at lower levels first, with the results of the lower level solutions then used to compose higher-order solutions.

Hierarchical problems are well described in "Sciences of the Artificial," by Herbert Simon, The MIT Press, Cambridge, Mass. (1981); which has been herein incorporated by reference. In that reference, systems are described as "near decomposable" when the system can be subdivided into multiple sub-systems, with interactions within each sub-system of a much higher magnitude than those between the sub-systems. Hierarchical systems are then described as those systems that are decomposable in this manner up a number of levels of difficulty, while always ensuring that stronger interactions are within the subsystems. Moreover, on each level groups of subsystems from lower levels are merged into one group ("chunk"). In the example of building a car, on higher levels the sub-systems that comprise the engine would be merged into a single component that provides rotational movement, without individual consideration of all the screws, cylinders, cables, etc. that make up the engine.

The embodiment 100 comprises a step 116 of creating a model capable of effectively representing such a hierarchical decomposition. In particular, the model used performs a step of merging multiple variables into a single variable. Additionally, the model may represent relationships between the merged variables such as dependencies, independencies, conditional dependencies, and conditional independencies that may exist across multiple levels between the merged single variables or "chunks." Those skilled in the art will appreciate that a number of modeling methods are available for achieving such representation, and that many of these methods are suitable for practice in invention embodiments.

In order to best describe the models useful for practice in embodiments of the present invention, it will be helpful to first discuss in general the probabilistic model used in the basic Bayesian optimization method: a Bayesian network. A Bayesian network is a directed acyclic graph with the nodes corresponding to the variables in the modeled data set (that is, to the positions in the solution strings). Mathematically, a Bayesian network encodes a joint probability distribution given by:

$$p(X) = \prod_{i=0}^{n-1} p(X_i | \prod X_i)$$

where $X=(X_0, \ldots, X_{n-1})$ is a vector of all the variables in the problem, $\Pi_{X_i}$ is the set of parents of $X_i$ in the network (the set of nodes from which there exists an edge to $X_i$) and $p(X_i|\Pi_{X_i})$ is the conditional probability of $X_i$ conditioned on the variables $\Pi_{X_i}$. A directed edge relates the variables so that in the encoded distribution, the variable corresponding to the terminal node will be conditioned on the variable corresponding to the initial node. More incoming edges into a node result in a conditional probability of the corresponding variable with conjunctional condition containing all its parents. The network encodes independence assumptions that each variable is independent of any of its antecedents in ancestral ordering given its parents.

To construct the network given the set of selected solutions, various methods can be used. Most methods have two basic components: a scoring metric which discriminates the networks according to their quality and search steps that search over the networks to find the one with the best scoring metric value. The Bayesian optimization method can use any scoring metric and search steps.

Embodiments of the present invention contemplate use of models that replace models used in the Bayesian optimization method with more sophisticated models that allow for richer linkage learning and thereby can be applied to hierarchically decomposable problems of appreciable complexity. To hierarchically solve a problem, an effective model should incrementally find important low-order partial solutions and combine these to create the solutions of higher order. Starting with single bits (symbols of base alphabet), once top high-quality solutions of some order are reached they can be treated as the building blocks to be used to construct solutions of higher order. In this fashion, the order of partial solutions obtained gradually grows over time.

Several particular modeling methods have been investigated and have proven to be of particular utility for practice of invention embodiments. These example modeling methods comprise use of Bayesian networks in combination with additional features such as hidden variables, use of Huffman networks, use of models with local structures, and use of marginal product model methods. Those skilled in the art will appreciate that other models will also be of utility in practice of the invention.

Bayesian Networks in Combination with Additional Features

Embodiments of the present invention may comprise probabilistic models that comprise a Bayesian network in combination with additional features, with the additional features allowing the basic Bayesian network to effectively model hierarchically decomposable problems. By way of example, the additional features may comprise local structures, hidden variables, and histograms.

Bayesian Networks with Local Structures

To encode the conditional probabilities corresponding to the nodes of the network, a simple probability table listing probabilities of all possible instances of a variable and its parents could be used. The probabilities of one particular value of each variable can be eliminated and computed using the remaining ones because the probabilities sum to one. However, the size of such a table grows exponentially with the number of parents of the variable even though many probabilities of higher order may be the same. To solve hierarchical problems, it has been discovered that it is advantageous to be able to represent conditional probabilities by structures that are polynomial in the order of interactions. While the order of interactions can be as high as the size of the problem, the number of corresponding alternative partial solutions must be polynomial in their order to allow efficient and reliable exploration.

It has been discovered that models comprising probabilistic models, such as Bayesian networks, in combination with local structures such as decision trees, decision graphs, default tables, and the like, to represent equalities among parameters are an effective method to represent conditional probabilities in the model which allow a more compact representation of the local densities in the model. Those knowledgeable in the art will appreciate that the term "local structures" as used herein is intended to broadly refer to mechanisms for compressing or representing in a compact manner parameters that specify local probability tables (in the case of discrete variables) or probability densities (in the case of continuous variables). Examples of local structures include, but are not limited to, decision trees and graphs, default tables, and the like.

The use of local structures to represent conditional probability tables has several significant advantages. Simply said, local structures allow for representation of information about many probabilities by storing only some portion of that and encoding only regularities of the probabilities to thereby reduce the resources required to store and process the probability data. For example, the number of parameters required to store probabilities with a large conditional part can decrease significantly. This makes the method work more efficiently as we increase the complexity of models. Also, by using decision graphs to guide the network construction, one can discover more complicated relationships that may not be evident when directly modifying the network. A richer learning of the problem results.

Additionally, the complexity of the models can be controlled by making prior probabilities of competing models inversely proportional to their complexity. Experiments suggest that setting the prior probability of a network to be inversely proportional to the number of bits required to store the parameters of the network (the frequencies) works very well. By using a scoring metric containing a complexity measure, one can both (1) use prior knowledge about the problem in network construction and (2) eliminate the need for a bound on the network complexity.

It is noted that in a some sense local structures may not really add direct "chunking" into a model in that local structures do not function to directly merge variables. Instead, local structures may be thought of as being an indirect chunking mechanism whereby relationships between merged variables may be represented in a high order and in a compact, efficient manner.

Bayesian Networks with Decision Trees and Graphs

A decision tree is a directed acyclic graph where each node except for the root has exactly one parent. The root has no parents. Non-leaf nodes of the tree are labeled by a variable (feature) on which to split. When a node is labeled by a variable v, we say that this node is a split on v. Edges from a split on v are labeled by non-empty distinct exhaustive subsets of possible values of v.

To traverse a tree given an assignment of all the variables, we start in a root and on each split on v continue to the child along the edge which contains the current value of v. For each instance (an assignment of all the variables), there is only one possible way of traversing the tree to a leaf. This is a result of the structure that dictates edges leading to different children must be associated with distinct subsets of values.

A leaf of a decision tree contains a quantity of information of interest, associated with all instances that end up a traversal through the tree in the leaf. To use decision trees for representing conditional probabilities of a particular variable, the leaves contain the conditional probabilities of the values of the variable given that the variables contained in a path from the root are fixed according to the path.

Figure 2A:
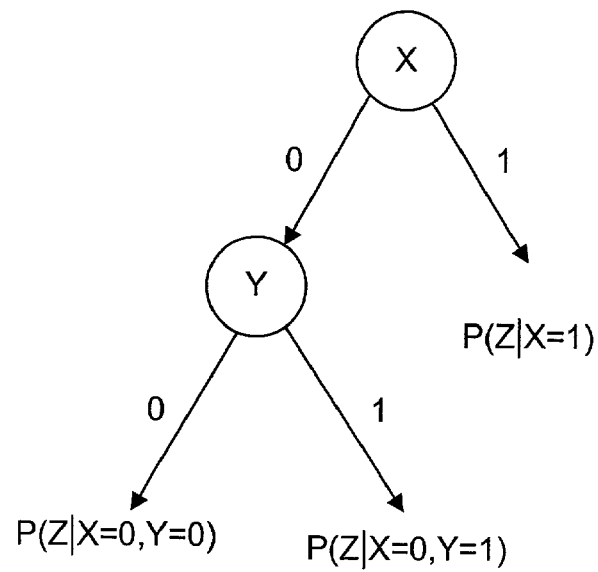
FIGS. 2(a) and 2(b) are an example decision tree and graph, respectively.
Figure 2B:
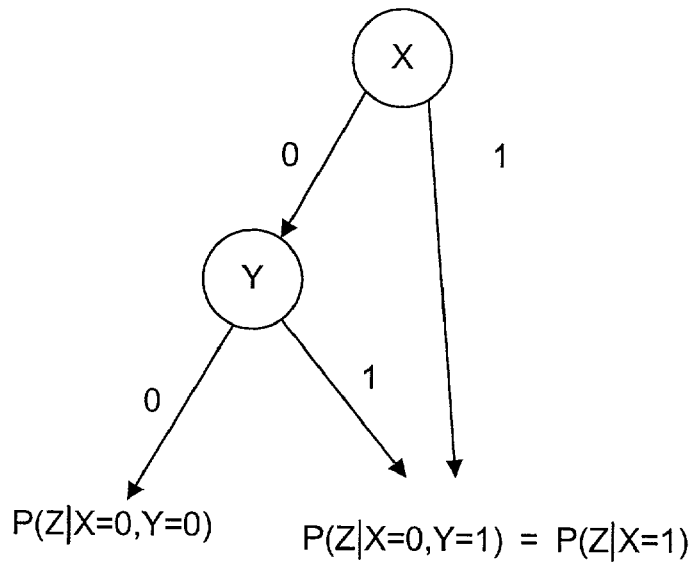

An example of a decision tree that encodes the conditional probability distribution $p(z|x,y)$ is shown in FIG. 2($a$). All variables in this figure are binary and thus can split only to two children, one for 0 and one for 1. Instance ($x=1$, $y=1$, $z=0$) would traverse the tree to the right-most leaf. Instance ($x=0$, $y=1$, $z=0$) would result in the middle leaf. This decision tree represents, for instance, the equality constraints $p(z|x=1, y=0)=p(z|x=1, y=1)$.

A decision graph is an extension of a decision tree in which each non-root node can have multiple parents. By a decision graph, any set of equality constraints can be encoded. This can be shown by simply constructing a complete tree and merging all leaves that are equal. An example of a decision graph is shown in FIG. 2($b$). This decision graph can be obtained by merging the leaves $p(z|x=0, y=1)$ and $p(z|x=1)$ which represents another equality constraint. It is important to note that the equality constraints, in fact, represent independence constraints. Moreover, each leaf in the decision graph for a variable represents independence assumptions of any variable not contained in the path from the root to this leaf, given the constraints specified by the corresponding path to this leaf.

It has been discovered that there are several advantages to steps of using decision graphs in combination with Bayesian networks in optimization methods. For example, significantly fewer parameters are required to represent a model. This saves memory and time requirements of both model construction as well as its utilization. Also, the use of decision graphs allows learning more complex class of models, with an example called Bayesian multinets. Another advantage is that methods comprising steps of creating a model comprising a Bayesian network with decision graphs are able to perform smaller and more specific steps with the result that better models with respect to their likelihood are constructed. Still further, the network complexity measure can be easily incorporated into the scoring metric so that a richer and more robust scoring metric results that is still based on Bayesian statistics and thus allows the use of prior information.

Bayesian Networks with Hidden Variables

Similar reduction of total model complexity can be achieved by steps that use hidden variables in combination with Bayesian networks. In fact, using hidden variables in combination with Bayesian networks is an alternative and more general approach to the problem of hierarchical model building. It is theorized that using these models would further improve model-building for problems of a very complex structure. Those skilled in the art will appreciate that there are a number of manners in which to incorporate hidden variables into a model. By way of graphical example, FIG. 3($b$) is an example of a Bayesian network that uses hidden variables to represent the same data as are shown in the graphical representation of FIG. 3($a$) of a Bayesian network.

Huffman Networks

A general idea of clustering the input variables and treating each cluster as an intact building block was discussed in "Linkage learning via probabilistic modeling in the ECGA," by G. Harik, IlliGAL Report No. 99010, University of Illinois at Urbana-Champaign, Illinois Genetic Algorithms Laboratory (1999) ("the Harik reference"), herein incorporated by reference. The models discussed in the Harik reference was referred to as a "marginal product model," and may be useful for practice in some invention embodiments. The marginal product model, however, may be limited in its usefulness in that it is capable only of merging the variables into groups.

Huffman networks go beyond the marginal product model in that directed edges are able to be used to relate the merged variables (chunks), and thereby allow merged groups of variables to interact in classical directed-acyclic-graph Bayesian networks. For each group or chunk of variables only instances that are in the modeled data set are considered. The merged variables or chunks are related as in classical directed-acyclic-graph Bayesian networks. Huffman Networks are discussed in more detail in "Using Bayesian networks for lossless compression in data mining," by S. Davies and A. Moore, Proceedings of the Fifth ACM SIGKDD International Conference on Knowledge Discovery & Data Mining (KDD-99) (pp. 387–391), San Diego, Calif., ACM Press (1999); herein incorporated by reference.

A Huffman network can be illustrated through the following example. Assume that at certain point in time, three positions with only two values are in the entire population: 000 and 111. Then, instead of working with each of these positions separately, they can be merged into a single binary variable with two new values 0' and 1', where 0' corresponds to 000 and 1' corresponds to 111. In this fashion, both the model complexity as well as the model expressiveness improve. Moreover, by reducing the number of variables, the search for good networks becomes more efficient and accurate. In a hierarchical problem, each group of merged variables represents an intact part of the solutions from a lower-level that is to be treated as a single variable on a higher level.

Figure 3A:
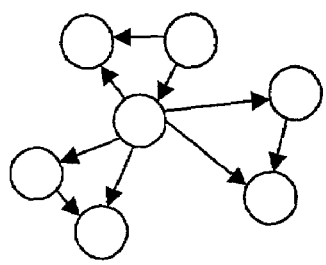
FIGS. 3(a)–(d) represent data as modeled using various models.
Figure 3B:
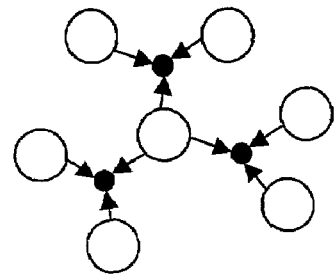
Figure 3C:
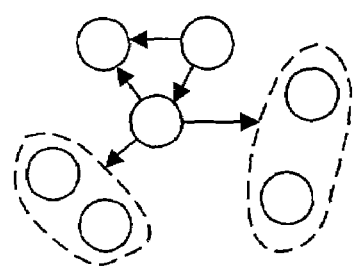
Figure 3D:
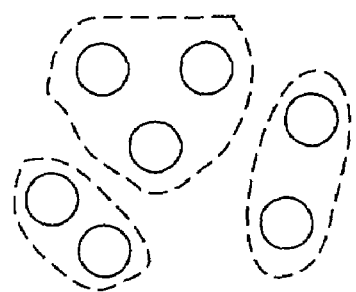

An example model with a few groups of variables as represented graphically by a Huffman network is shown in FIG. 3(c), which can be compared with the graphical representation of a Bayesian network of the same variables in FIG. 3(a). By way of further comparison, an example of a model representing the same variables using the marginal product modeling method of the Harik reference is shown in FIG. 3(d). The use of Huffman networks does not require sacrificing modeling generality as is required by the model proposed by Harik (FIG. 3(d)). All relationships expressed by DAG models can be covered. On the other side, the overly complex DAG models used in the original Bayesian method (FIG. 3(a)) are significantly simplified by "crossing over" the two approaches.

Referring once again to FIG. 1, the embodiment 100 in its step 116 of creating a model to fit the second set of solutions may comprise creating a plurality of models, and then a step of choosing a preferred model from the plurality. Indeed, it will be appreciated by those knowledgeable in the art that in using probabilistic models such as Huffman networks or Bayesian networks with hidden variables or local structures, the networks are generally built by linking single or merged variables (chunks) with one another, with the links created between single or chunked variables as chosen according to some scoring metric. That is, the network is "built" by linking variables or chunks according to some measure of optimization. In this sense, multiple networks are built, with one chosen over another according to some scoring metric.

It will therefore be understood that as used herein the steps of "creating a plurality of models and choosing a preferred one" comprises the steps of building a network by choosing a preferred network configuration. The choosing of one particular network model over others to optimize some scoring metric may be referred to as a step of "learning" the model.

To learn a model of solutions on a certain level, those skilled in the art will appreciate that a number of scoring metrics are appropriate for use with embodiments of the invention, including, by way of example, a minimum description length (MDL) metric, and the Bayesian Dirichlet metric with or without additional term preferring simpler networks, and combinations of these and other methods. Simpler models are generally preferred to more complex ones, since the merged variable chunks tend to grow indefinitely and the boundary on the complexity of models cannot be directly applied without weakening the modeling capabilities on hierarchical problems.

Bayesian Dirichlet Scoring Metric

The Bayesian Dirichlet (BD) metric is described in detail in "Learning Bayesian networks: The combination of knowledge and statistical data," By D. Heckerman et al., Microsoft Corporation Technical Report No. MSR-TR-94-09, Redmond, Wash. (1994) ("the Heckerman reference"), herein incorporated by reference. Generally, the BD metric combines the prior knowledge about the problem and the statistical data from a given data set. The probability of a Bayesian network B given data D can be computed by applying Bayes theorem as $$p(B|D) = \frac{p(B)(D|B)}{p(D)} \qquad \text{(Eqn. 1)}$$

The higher the p(B|D), the more likely the network B is a correct model of the data. Therefore, the value of p(B|D) can be used to score different networks and measure their quality. This measure is called a Bayesian scoring metric, or the "posterior" probability of B given data D. Since we are only interested in comparing different networks (hypotheses) for a fixed data set D, we can eliminate the denominator of the above equation. The remaining two terms in the above equation are discussed in the following paragraphs.

The probability p(B) is called the "prior" probability of the network B. It can be used to incorporate prior information about the problem by assigning higher probabilities to the networks confirming our intuition or expert knowledge. The following assignment can be used to bias the search toward, for example, networks similar to a prior network specified by an expert:

$$p(B) = c\kappa^\delta$$

where c is a normalization constant, $\kappa \in (0,1)$ is a constant factor penalizing the network for each unmatched edge with the prior network, and $\delta$ is the so-called symmetric difference between B and the prior network. By setting the prior network to an empty network the metric gives preference to simpler networks. However, it has been discovered that this pressure is often not strong enough to eliminate the upper boundary on the network complexity required for an efficient learning. A more effective assignment is discussed below with regards to scoring Bayesian networks with decision graphs.

It is difficult to find a closed expression for the probability p(D|B) of the data D given the network B. A closed expression for p(D|B) was derived in the Heckerman reference by making a number of assumptions on the data. A first assumption is that the data is a multinomial sample. The second assumption is the assumption of parameter independence, which says that (1) the parameters associated with each variable are independent (also called global parameter independence) and that (2) the parameters associated with each instance of the parents of a variable are independent (also called local parameter independence).

The assumption of parameter modularity states that the parameters (values in the conditional probability tables) associated with a variable depend only on the variable and its parents. The Dirichlet assumption restricts the parameter set for each variable to have a Dirichlet distribution where each exponent corresponds to one possible instance of the variable and its parents. The last assumption is the one of complete data, stating that the database D is complete, i.e. it contains no missing data. Under the above assumptions, the following closed expression can be derived for p(D|B):

$$p(D|B) = \prod_{i=0}^{n-1} \prod_{\pi_i} \frac{\Gamma(m'(\pi_i))}{\Gamma(m'(\pi_i) + m(\pi_i))} \prod_{x_i} \frac{\Gamma(m'(x_i, \pi_i) + m(x_i, \pi_i))}{\Gamma(m'(x_i, \pi_i))} \quad \text{(Eqn. 2)}$$

where the product over $\pi_i$ runs over all instances $\pi_i$ of the parents $\Pi_i$ of $X_i$, and the product over $x_i$ runs over all instances $x_i$ of $X_i$. By $m(\pi_i)$, the number of instances in D with $\Pi_i$ instantiated to $\pi_i$ is denoted. When the set $\Pi_i$ is empty, there is one instance of $\Pi_i$ and the number of instances with $\Pi_i$ instantiated to this instance is set to N (the size of the data set D). By $m(x_i, \pi_i)$, we denote the number of instances in D that have both $X_i$ set to $x_i$ as well as $\Pi_i$ set to $\pi_i$. The metric computed according to the above equation is called the Bayesian-Dirichlet metric, since one of the assumptions made to compute the formula is that the parameters are distributed according to a Dirichlet distribution.

The terms $m(x_i, \pi_i)$ and $m(\pi_i)$ express our beliefs in frequencies $m(x_i, \pi_i)$ and $m(\pi_i)$, respectively, and can be used as another source of prior information. A simple prior for the parameters $m(x_i, \pi_i)$ and $m(\pi_i)$ is to assume $m(x_i, \pi_i)=1$ for all $x_i$ and $\pi_i$, and compute $m(\pi_i)$ according to the above assignment. The metric using this assignment may be referred to as the K2 metric.

Minimum Description Length Metric

The minimum description length metric is an additional scoring metric useful in practice of embodiments of the invention. A minimum description length metric is based on the philosophical rule called Occam's razor, claiming that the simplest of competing theories be preferred to the more complex ones. The MDL metric favors short models. A total description length of a data set D compressed according to a given model is defined as the sum of the space, measured in bits, required by the model, its parameters (various frequencies), and the data compressed according to the model.

For example, consider a network B with each node corresponding to one variable from $X=(X_0, \ldots, X_{n-1})$ as a model to compress the data set D of size N. To store the model, we need to store both the network structure (a directed acyclic graph) and the conditional probabilities used in the encoded distribution terms ($p(X_i|\Pi_i)$ from Equation 1). The length of the compressed data then depends on the values of conditional probabilities.

A directed acyclic graph can be encoded by storing a set of parents of each node. The set of parents of a particular node can be encoded by the number of the parents followed by the index of the set of parents in some agreed-upon enumeration of all possible sub-sets of variables of the corresponding cardinality. Since each node can have at most (n-1) parents, to encode a number of parents of each node in a binary code, $\log_2 n$ bits can be used. There are $$\left( \frac{n!}{|\Pi_i|!(n-|\Pi_i|)!} \right)$$

total possible number of sub-sets of variables of the cardinality $|\Pi_i|$ where $|\Pi_i|$ is the number of parents of $X_i$. Therefore, to encode the set of parents of $X_i$, $$\log_2 \left( \frac{n!}{|\Pi_i|!(n-|\Pi_i|)!} \right)$$

bits can be used. The number of bits needed to encode a network structure B, denoted by length(B), can be then computed as $$\text{Length}(B) = \sum_{i=0}^{n-1} (\log_2 n + Z)$$

where $Z = \left( \frac{n!}{|\Pi_i|!(n-|\Pi_i|)!} \right)$

To store the conditional probabilities according to the distribution encoded by the network, we need to store all combinations of all but one values $x_i$ of each variable $X_i$ and all possible instances $\pi_i$ of its parents $\Pi_i$. For each such combination of $x_i$ and $\pi_i$ the corresponding conditional probability $p(x_i|\pi_i)$ must be stored. For binary variables, there are $2^{|\Pi_i|}$ possible combinations of values of the variable and its parents (excluding one value $x_i$ for each $\pi_i$, e.g. $x_i=1$, for which $p(x_i|\pi_i)$ can be computed from the remaining conditional probabilities). This is an upper bound and can be reduced by using more sophisticated data structures to encode the conditional probability tables. To accurately encode each conditional probability, we can use $0.5 \log_2 N$ bits. Thus, the overall number of bits needed to store the table of conditional probabilities for the network B, denoted by length(X, $\Pi$), is given by $$\text{length}(X, \prod) = (0.5)\log_2 N \sum_{i=0}^{n-1} 2^{|\Pi_i|}$$

Given the conditional probabilities $p(x_i|\pi_i)$ for all values $x_i$ and $\pi_i$ of $X_i$ and its parents $\Pi_i$, respectively, the overall number of bits needed to store the data set D by using Huffman coding for the instances in D, denoted by length (D|B), can be approximated by $$\text{length}(D|B) = -N \sum_{i=0}^{n-1} \sum_{x_i} \sum_{\pi_i} p(x_i, \pi_i) \log_2 p(x_i|\pi_i)$$

where $p(x_i|\pi_i)$ is the probability of $X_i=x_i$ and $\Pi_i=\pi_i$, the sum over $x_i$ runs over all instances $x_i$ of $X_i$, and the sum over $\pi_i$ runs over all instances $\pi_i$ of $\Pi_i$. The total length of the model, its parameters, and the data set compressed according to this model, denoted by length(B,D), is then given by:

length(B,D)=length(B)+length(X, $\Pi$)+length(D|B)

The lower the above measure, the shorter the description length of the data D given the model B. Therefore, when constructing a network, it may be advantageous to minimize the above measure. A major advantage of the MDL metric is that it favors simple models so that no upper bound on the model complexity has to be specified. This bound comes up naturally.

However, when using a greedy algorithm for model construction, the problem of finding a valid model can become more difficult. Moreover, the MDL metric does not allow the use of prior information about the problem. In many real-world problems the utilization of expert knowledge (which is often available in some form) may be unavoidable. Other method steps may be used to deal with the complexity of models by specifying the prior probability of each model inversely proportionally to its complexity.

Scoring Metrics for a Huffman Network and Constructing the Networks:

To learn a model of solutions when using Huffman network model, it has been discovered that a combination of the learning methods used in the original Bayesian optimization method, the extended compact genetic algorithm as taught in the Harik reference, as well as Bayesian networks with local structure as described, for example, in structure as discussed, for example, in "Learning Bayesian networks with local structure," by N. Friedman and M. Goldszmidt, In Jordan M. I., Graphical Models (1 ed.), pp. 421–459, MIT Press, Cambridge, Mass. (1999) ("the Friedman reference"), herein incorporated by reference, is effective. To discriminate the networks, a minimum description length (MDL) metric will be used. Other metrics may of course be comprised, with an example being a BD metric. However, simpler models are preferred to more complex ones, since the clusters tend to grow indefinitely and the boundary on the complexity of models cannot be directly applied without weakening the modeling capabilities on hierarchical problems.

To store data according to a particular model, it is required to store (1) the definition of groups of variables (merged chunks) in the model, (2) the probabilistic relationships between the groups of variables (edges between the groups in the model), and (3) the data set (the set of selected solutions) compressed according to the model. Each variable (bit position) is in exactly one of the chunks. The description of data will contain the following fields

| Number of Groups | Group 0 | Group 1 | *** | Group $|G|$ | Compressed Data |
|---|---|---|---|---|---|

In the following discussion the following notation will be used:

n—number of variables
N—the number of instances in the modeled data set
m—the number of chunks (groups of variables)
$G=(G_0, \ldots, G_m)$—the set of clusters $G_i$
$|G_i|$—the number of variables in $G_i$
$\|G_i\|$—the number of instances of variables $G_i$
$\Pi_i$—the set of parent groups of $G_i$
$|\Pi_i|$—the number of parent groups in $\Pi_i$
$\|\Pi_i\|$—the number of instances of the set of groups $\Pi_i$ There can be at most n groups of variables, i.e. m n, and therefore in order to store the number m of groups, at most $\log_2 n$ bits can be used. The definition of each group contains (1) the size of the group, (2) the indices of the variables contained in the group, (3) the set of instances of this group, (4) the set of this group's parent identifiers, and (5) the set of conditional probabilities of the instances in this group given all the instances of its parent groups. There can be at most n variables in each group, and therefore the size of each group can be stored by using $\log_2 n$ bits. This boundary could be further reduced by analyzing the entire description at once. There are $$\left(\frac{n!}{|G_i|!(n-|G_i|)!}\right)$$

possibilities to choose variables to form $G_i$. Thus, to identify the set of variables in $G_i$, we need to store only the order of this subset in some ordering of all possible subsets of this size, i.e. we need at most $$\log_2\left(\frac{n!}{|G_i|!(n-|G_i|)!}\right)$$

bits. Assuming that we use binary variables, the set of instances of $G_i$ can be stored by using $\log_2 2^{|G_i|}$ bits for the number of instances and $|G_i|\cdot\|G_i\|$ bits for the specification of all bits in these instances. Each group can have at most (n-1) parents in the network. Thus, the number of parents can be stored by using $\log_2(n-1)$ bits. The number of bits needed to store the components of $\Pi_i$ is $$\log_2\left(\frac{m!}{|\Pi_i|!(n-|\Pi_i|)!}\right)$$

To store conditional probabilities for $G_i$, a frequency of each combination of instances of the variables in $G_i$ and its parents will be stored. There are at most $\|G_i\|\cdot\|\Pi_i\|$ possible instances. However, this number might be further reduced by using local structures as discussed in the Friedman reference, or by considering only instances that really appear in the modeled data set. Each frequency can be stored in 0.5 $\log_2 N$ bits with a sufficient degree of accuracy. Thus, to store the conditionals corresponding to $G_i$, we need at most:

$$\frac{|G_i|\log_2 N}{2}\prod_{G_j \in \Pi_i}(\|G_j\|-1)$$

since the last frequency can be computed from the remaining ones.

To store the data compressed according to the above model, we need at most:

$$-N\sum_{i=0}^{|G|-1}\sum_{g_i,\pi_i}p(g_i,\pi_i)\log p(x_i|\pi_i)$$

as discussed by the Friedman reference, where the inner sum runs over all instances $g_i$ and $\pi_i$ of variables in $G_i$ and $\Pi_i$ respectively, $p(g_i,\pi_i)$ is the probability of the instance with the variables in $G_i$ and $\Pi_i$ set to $g_i$ and $\pi_i$ respectively, and $p(g_i|\pi_i)$ is the conditional probability of the variables in $G_i$ set to $g_i$ given that the variables in $\Pi_i$ are set to $\pi_i$.

The overall description length is then computed as the sum of all terms computed above. The lower the metric, the better the model.

Constructing the Huffman Network

A method for building Huffman networks for compression of large data sets proceeds similarly as other search methods used for learning Bayesian networks by incrementally performing elementary graph operations on the model to improve the value of the scoring metric. The greedy search method has been discovered to be useful due to its simplicity and efficiency. A general scheme of the greedy search method used in the original Bayesian Optimization method is as follows:

1) Initialize the network (to an empty, random, or the best network from the last generation).
2) Pick an elementary graph operation that improves the score of the current network the most.
3) If there is such operation, perform it, and go to step 2.
4) If no operation improves the score, finish.

In addition to known operations such as edge addition, edge removal, and edge reversal, embodiments of the present invention can comprise steps of either (1) joining two of the groups of variables to form a single cluster or (2) moving one variable from one cluster to another one (and deleting clusters that have become empty, if any). In both cases, the conflicts appearing with existence of cycles must be resolved. When joining two groups, the edges can be either conservatively rearranged so that only edges that coincided with both of the groups will be considered or so that all edges to and from either of the groups will be considered, if possible.

Scoring Bayesian Networks with Conditional Probabilities and Independence

Embodiments of the present invention further comprise steps for computing a Bayesian score for Bayesian networks where conditional probabilities and independence assumptions for each variable are encoded by decision graphs. Conditional probabilities for a variable $X_i$ are stored in a decision graph $G_i$ (i.e., for each variable there is one decision graph).

Those knowledgeable in the art will appreciate that the Bayesian score can be computed for Bayesian networks where the independence constraints are encoded by a decision graph for each of the variables in a very similar way. The outer product from Eqtn. 2 remains the same. The middle product runs over all leaves of the decision graph $G_i$ corresponding to the variable $X_i$. The inner-most product runs over all possible instances of the variable $X_i$. Thus, $$p(D \mid B) = \prod_{i=0}^{n-1} \prod_{l \in L_i} \frac{\Gamma(m'(i, l))}{\Gamma(m(i, l) + m'(i, l))} \prod_{x_i} \frac{\Gamma(m(x_i, i, l) + m'(x_i, i, l))}{\Gamma(m'(x_{i,i,l}))}$$

where $L_i$ is the set of leaves in the decision graph $G_i$ for $X_i$, $m(i,l)$ is the number of instances in D which end up the traversal through the graph $G_i$ in the leaf l, $m(i,l)$ is the number of instances that have $X_i = x_i$ and end up the traversal of the graph $G_i$ in the leaf l, the $m'(i,l)$ represents our prior knowledge about the value of $m(i,l)$, and $m'(x_i, i, l)$ represents our prior knowledge about the value of $m(x_i, i, l)$. The Bayesian score is then given by using Bayes theorem (see Eqtn. 1).

To adjust the prior probability of each network according to its complexity, we first compute the description length of the parameters required by the networks. To encode one frequency in the data set of size N, it is sufficient to use $(0.5)\log_2 N$ bits. Therefore, to encode all parameters, we need $(0.5)\log_2 N \Sigma_i |L_i|$ bits, where $\Sigma_i |L_i|$ is the total number of leaves in all decision graphs. To favor simpler networks over more complex ones we can set the prior probability of a network to decrease exponentially with the description length of the set of parameters they require. Thus, $$p(B) = c 2^{0.5 \log_2 N \Sigma_i |L_i|}$$

where c is a normalization constant required for the prior probabilities of all networks to sum to 1. The value of a normalization constant does not affect the result, since we are only interested in relative comparisons of networks and not the absolute value of their likelihood. As will be appreciated when constructing the network, the assignment in the last equation is sufficient to bias the model construction to networks with less parameters and avoid superfluously complex network structures without having to determine the maximal number of incoming edges in advance. This eliminates another degree of freedom for setting the parameters of the algorithm and thus makes the algorithm easier to use.

The above assignment can be extended or fully replaced by the one that takes into account our prior knowledge about the problem by favoring models that are more similar to the prior network.

In addition to searching the plurality of models using scoring metrics such as the minimum description length or the Bayesian Dirichlet metrics, other steps of determining a preferred model may be comprised. By way of example and not limitation, models may be compared using a binary "better than" relation wherein two models are compared and the better of the two chosen, greedy algorithm method, a local hill climbing method, a gradient search, a tabu search, and a simulated annealing method. Further, steps that comprise combinations of these or other methods may be comprised. Those knowledgeable in the art will appreciate that there are many additional known methods for choosing a preferred model from amongst the plurality that exists.

Constructing a Network Comprising Decision Graphs

Figure 4A:
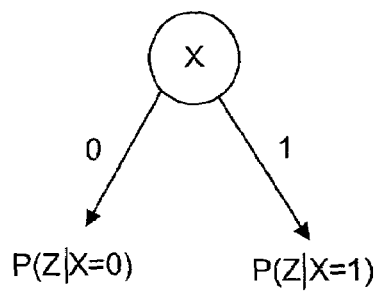
FIGS. 4(a)–(c) are useful to illustrate various operations on decision trees and graphs.
Figure 4B:
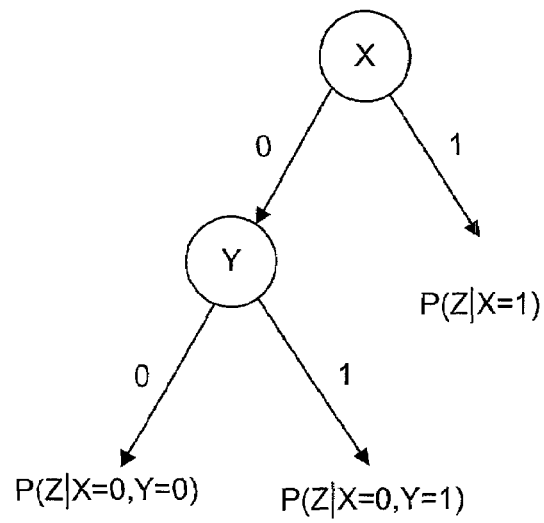
Figure 4C:
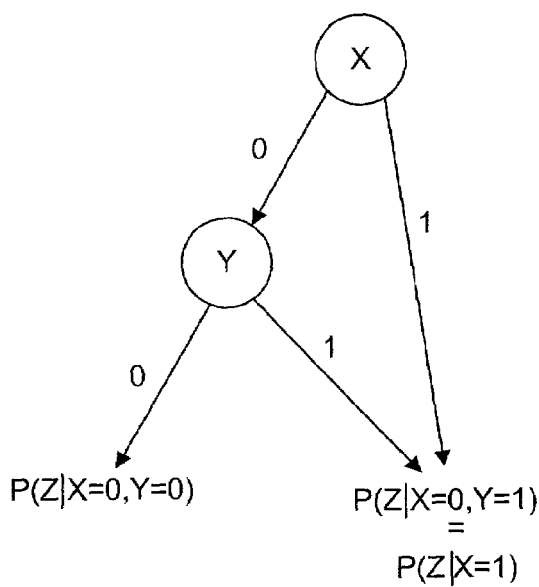

To construct a decision graph on binary variables, two operators are sufficient. The first operator is a split, which splits a leaf on some variable and creates two new children of the leaf, connecting each of them with an edge associated with one possible value of this variable, for example, 0 or 1. The second operator is a merge, which merges two leaves into a single leaf and introduces a new equality constraint on the parameter set. With reference to FIG. 4, the decision graph shown in FIG. 4(b) results from splitting the leaf containing p(z|x=0) of the graph of FIG. 4(a) on variable y. The graph of FIG. 4(c) can be obtained by merging the leaves p(z|x=1) and p(z|x=0, y=1) of the decision graph FIG. 4(b). It is noted that it serves no purpose to split a leaf on a variable that was encountered on the path from the root to this leaf and therefore these operators will not be allowed.

For variables that can obtain more than two values, two versions of the split operator can be considered: (1) a complete split which creates one child for each possible value of the variable (as above), and (2) a binary split, which creates one child correspond to one particular value and another child for all the remaining values. These two operators are equivalent in case of binary variables. Other alternatives can also be considered, including splitting the node on a variable so that each of the newly created children corresponds to a subset of values of this variable.

An embodiment of the invention further comprises steps of constructing a Bayesian network that comprises decision graphs using the above discussed operators. The greedy method is used to search the possible networks to choose a most preferred, although the greedy method is preferably used not to manipulate the constructed network directly but instead only to modify the decision graphs corresponding to each variable. The network B is initialized to an empty network that contains no edges. The decision graph $G_i$ for each variable $X_i$ is initialized to a single-leaf graph, containing only probabilities $p(X_i)$.

In this invention embodiment, each iteration, all operators (e.g., all possible merges and splits) that can be performed on all decision graphs $G_i$ are examined. The operator that improves the score the most is performed on the corresponding decision graph. The operators that can be performed include (1) splitting a leaf of some decision graph on a variable that was not encountered on the path from the root to the leaf and (2) merging two leaves into a single leaf.

When performing a split operator, we must make sure that no cycles appear in the network B. To guarantee that the final network remains acyclic, we can continuously update the network B each time we perform a split. Once we split a leaf of the graph $G_i$ on a variable $X_j$, we add an edge $(X_j, X_i)$ to the network B. If a cycle would appear in case of this addition, we ignore the operator and consider alternative ones. This requirement could be alleviated. For example, the use of decision trees allows Bayesian multinets with one or more distinguished variables.

The general steps of an invention embodiment comprising the greedy method for constructing a network using decision graphs is:
1) Initialize a decision graph $G_i$ for each node $X_i$ to a graph containing only a single leaf.
2) Initialize the network B into an empty network.
3) Choose the best split or merge that does not result in a cycle in B.
4) If the best operator does not improve the score, finish.
5) Execute the chosen operator.
6) If the operator was a split, update the network B as described above.
7) Go to step 3.

It is important to notice the difference between the method steps of using a greedy algorithm that directly modifies the network and the one that modifies the decision graphs. Adding an edge into a Bayesian network and using a full conditional probability table to store the corresponding probabilities corresponds to splitting all leaves of the decision graph corresponding to the terminal node of the edge on the variable corresponding to the initial node of the edge. However, by modifying only the decision graph, finer steps can be performed which may positively affect the quality of the resulting model.

Referring once again to the flowchart of FIG. 1, once created, the embodiment 100 comprises a step of using the model to generate a third set of solutions (block 118). The members of this third set of solutions are then integrated into the first solution set, with at least a portion of the first solution set replaced to create a new solution set (block 120). To accomplish this substitution, steps of replacing the worst of the first set, random replacement, and the like may be comprised. The new solution set is then evaluated to determine whether completion criteria have been satisfied (block 122). The completion criteria may be related, by way of example, to the quality or fitness of the ultimate solution. Completion criteria may be the result of, for example, expert knowledge provided by a user, may be learned through query to an external source, or may be provided in any like manner. If the criteria are not satisfied, the new solution set replaces the first solution set and the method is repeated (block 124). The method embodiment 100 will continue to repeat itself in this manner with the solution set continually evolving until the completion criteria have been met (block 126).

It is noted that still another embodiment of the invention may comprise steps of creating a plurality of different probabilistic models, and using each of the models to generate a portion of the third solution set. The embodiment may comprise a step of using each of the models at a selected rate, so that a probability distribution can be encoded to the created third set of solutions. By way of example, a Huffman network and a Bayesian network with local structures could be created. In a subsequent step, a third set of solutions could be generated with 30% of new points generated with the Huffman network and 70% of the new points with the Bayesian network. Those knowledgeable in the art will appreciate that such an embodiment may be advantageous under certain circumstances.

Replacement Niching

Figure 5:
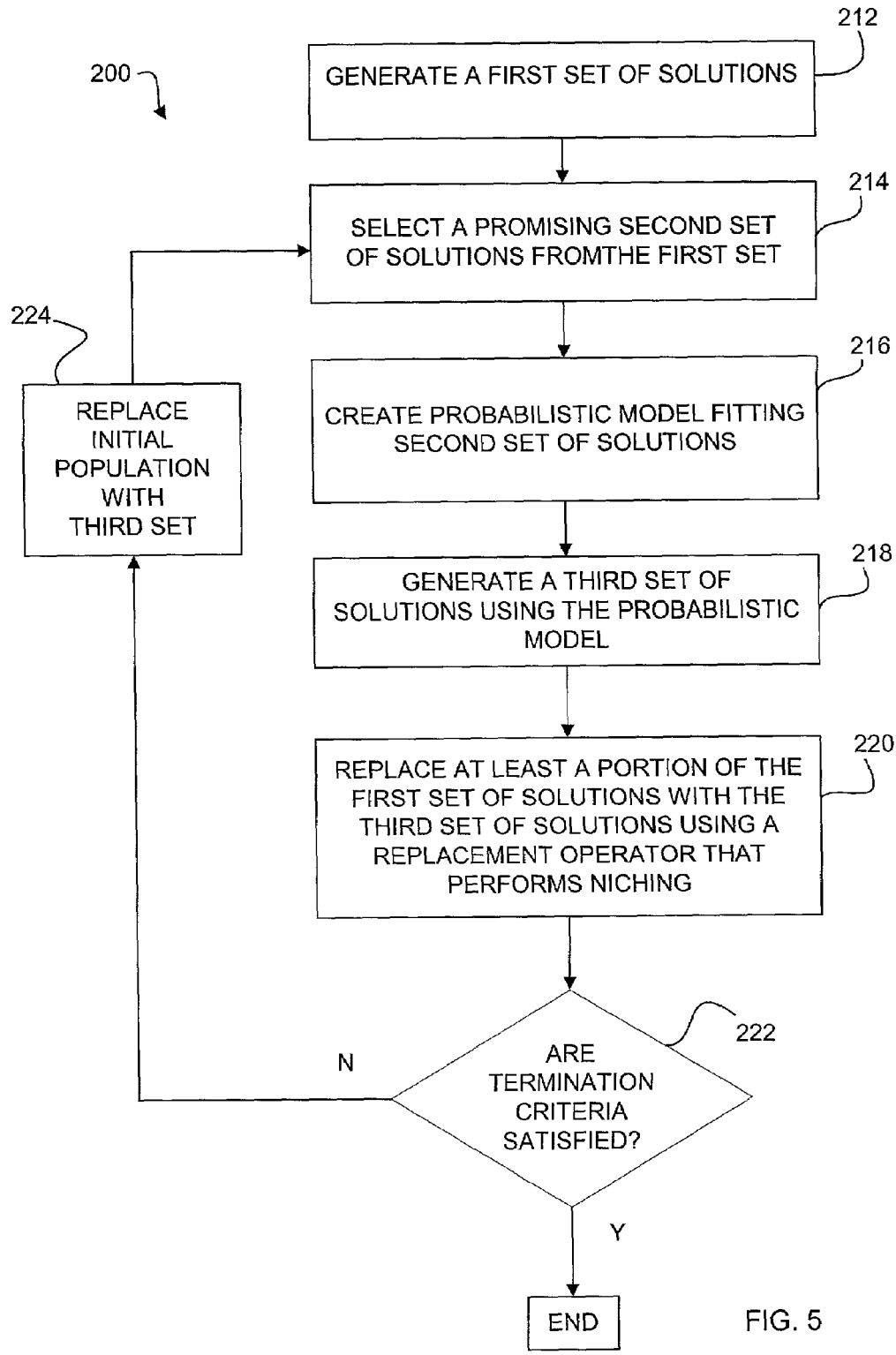
FIG. 5 is a flowchart illustrating the general steps of an additional example embodiment of the invention that comprises steps of replacement niching.

An additional embodiment of the invention comprises a method for optimizing a solution that is similar in many respects to the embodiment 100 save for a few variations. In particular, FIG. 5 is a flowchart illustrating the steps of the embodiment 200 of a method of optimizing a solution set of the invention. In general, it will be noted that the embodiment 200 comprises a step of performing replacement using an operator that performs niching (block 220).

Since the generation of a probabilistic model in the optimization method does not encourage using a steady state genetic algorithm, it has been discovered that it is advantageous to incorporate niching in the replacement step of an optimization method. Because the particular niching mechanism used in one embodiment is based on a restricted tournament mechanism, a replacement niching method is referred to as the "restricted tournament replacement" (RTR). Other niching methods will of course likewise be useful at the replacement step (block 320), with an example being crowding.

In the embodiment 200 with RTR, promising solutions are first selected from the current population (block 214) and a probabilistic model such as a Bayesian network is constructed as their model (block 216). The built model is then used to create new solutions (block 218). However, the new solutions are not automatically added into the original population, replacing random or the worst solutions, as may be done in other invention embodiments. Instead, the embodiment comprises a step of performing replacement using niching, such as RTR (block 220). After performance of a niching replacement step, some of the new individuals will be included in the new population and some will be discarded. The embodiment 200 starting with the selection is repeated until the termination criteria are met.

In the replacement step (block 220), steps of an RTR niching method that operates similar to crowding and restricted tournament selection may be comprised. The replacement is localized by selecting a sub-set of the original population (first set of solutions) for each new offspring (each member of the third set of solutions) and letting the offspring compete with the most similar member of this subset. If the new offspring is better, it replaces the corresponding individual. The measure of similarity can be based on either the genotype or the phenotype.

It is noted that the size of the subsets that are selected from the original population to incorporate each new individual into is of some consequence. The size of these subsets is referred to as a "window size." A window size should be proportional to the number of niches even though big populations can allow powerful niching even with smaller window sizes. A number of window sizes have been investigated on various difficult problems. Even though for almost all problems, a window size of between about 15 and 25 members, and particularly of about 20 members, worked very well, it has been discovered that for the most difficult problems, increasing the window size proportionally to the size of the problem has significantly improved the performance.

Proportionally sizing the window size to the problem size is theorized to be effective for the following reasons. For correct decision making on a single level, the population size must grow proportionally to the problem size. To maintain a certain number of niches, one must lower bound the size of each niche by a certain constant. Therefore, a population size proportional to the problem size allows for maintenance of the number of niches proportional to the problem size. The number of niches that RTR can maintain is proportional to the window size. Therefore, the window size growing linearly with the size of the problem is the strongest niching one can afford without increasing population-sizing requirements.

One of the reasons for using a replacement based niching strategy, with RTR comprising an example, in practice of optimization methods of the invention is that it is easily incorporated into the replacement process and does not affect modeling. With fitness sharing selection based niching, on the other hand, the input to the probabilistic model changes and it becomes more difficult to predict the behavior of the optimization. Also, optimization method embodiments of the invention comprising steps of RTR have proven to be effective for discovering multiple optima in problems that have multiple solutions.

Spatial Separation Niching Embodiments

Figure 6:
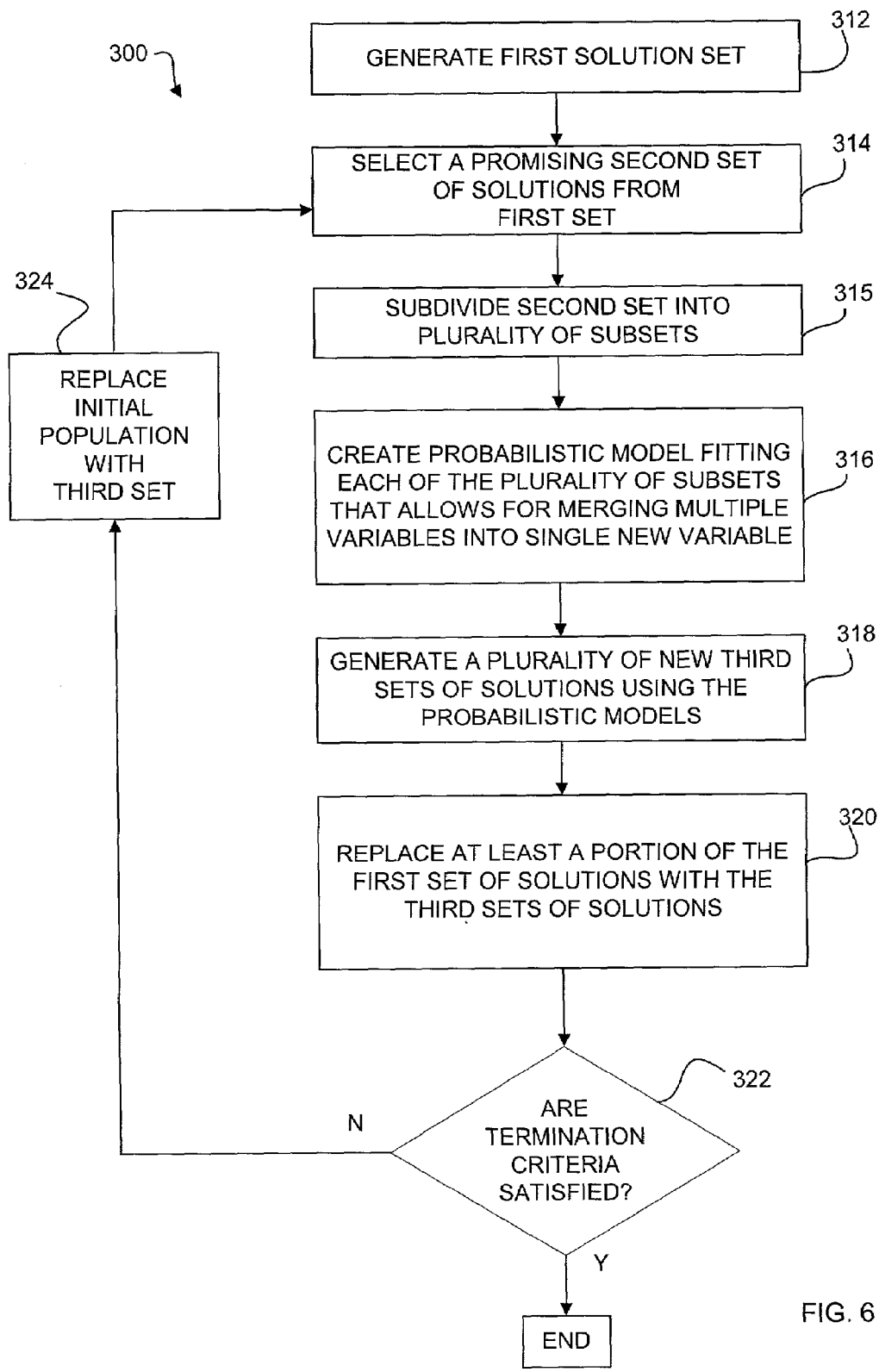
FIG. 6 is a flowchart illustrating the general steps of an additional example embodiment of the invention that comprises steps of performing spatial separation niching.

Still another example embodiment 300 of the invention is generally illustrated by the flowchart of FIG. 6. Such embodiments have proven to be of particular utility in solving problems that involve symmetry or otherwise have a plurality of local optima to be investigated. In order to best understand this invention embodiment, it will be useful to discuss in general the particular types of problems it is useful for application to.

Symmetry is said to exist, for example, for a combinatorial problem when there are a number of different solutions to the problem, or where many regularities in the entire landscape can often be observed. In a graph bisection, for instance, the goal is to partition the nodes of a given graph into two equally sized groups so that the number of edges between the groups is minimized. Each bit in the solution string corresponds to one node in the graph and its value determines the group to which this node is assigned. It is easy to see that in this problem, there are at least two optima that are complementary. Moreover, the average fitness of any schema is equal to the average fitness of the complement of the schema, which is fixed in the same positions as the original schema, but to the exactly opposite values, e.g.

$$f(***00*1)=f(*11*0**)$$

This implies that the fitness of each solution does not depend on the value of a particular bit or a set of bits but on the overall combination, which can often be difficult to obtain. Each schema and its complement have the same fitness on average and unless the population drifts to either side, an optimization method has no mechanisms to decide which way to go from a uniformly distributed population.

Many optimization methods guide the exploration of the search space to regions that can be reached by combining important parts of promising solutions found so far. However, in case of symmetric problems, this often results in a decrease in the solution quality. In the simplest case (e.g., the graph partitioning mentioned above), there are two complementary parts of the search space that are to be explored. However, combining high-quality solutions and their complements that are equally good often results in poor solutions. Furthermore, as it was pointed out above, the optimization method has no means of deciding between complementary partial solutions since both seem to be of the same quality on average. If the traditional niching were incorporated to eliminate genetic drift, the optimization method would either converge very slowly or would never reach the optimum.

This becomes a crucial problem for the optimization methods that use only macroscopic information about the partial solutions in the population of parents to generate new offspring. The problem can be eliminated only by using more complex models that would take into account higher order dependencies. With a more complex model, traditional niching methods as tournament selection with continuous sharing could be used. However, using more complex models results in extra computational resources.

Similar property can be observed in a simple symmetrical two-max function with equally sized peaks which is defined as $$f_{TWO-MAX}(X) = \left|\frac{n}{2} - u\right|$$

where u is the sum of bits in the input string, n is the length of the input string, and "|. . .|" denotes absolute value. This function has two global maxima in (0, 0, . . . , 0) and (1, 1, . . . , 1), and the fitness of each solution is equal to the fitness of its complement. Even though the two-max is composed of two simple linear functions which can be optimized by some known evolutionary methods, their convergence on the two-max can get very slow.

Clustering to Solve Symmetry

In all the problems mentioned above there are two complementary parts of the search space, each with the same structure. This structure can be very simple as in the two-max function where both parts are simple linear unimodal functions or more complex as in the graph partitioning where in most cases each part contains a large number of local optima. However, there exist algorithms that are able to deal with a wide range of problems and if they were able to distinguish between the two parts of the solution space, they would be able to optimize the problem very efficiently. The motivation to introduce clustering in evolutionary algorithms is that by helping the algorithm to separate the two or more complementary parts of the solution space, the problem of symmetry would be eliminated and the algorithms would simply not have to deal with it. By using optimization methods that can solve the problem if the symmetry is not present in a problem (as a linear problem in case of two-max), the problems could be solved very efficiently, accurately, and reliably.

It has been discovered that invention embodiments comprising steps of clustering have proven to be very powerful for discovering and maintaining solutions close to a number of different optima. Also, clustering is able not only to improve niching while selecting better solutions from the entire population, but is also to separate unlike parts of the search space and process each part separately. Furthermore, clustering is not directly driven by fitness but the genotype itself. A general concept of using multiple populations, each corresponding to one optimum (ideal case), was introduced in "Evolutionary speciation using minimal representation size clustering," by C. Hocaoglu et al., Evolutionary Programming IV, pp. 187–203 (1995), herein incorporated by reference.

Referring now to the flowchart of FIG. 6, an initial solution set is generated (block 312). A selection operator is used to select a second set of preferred solutions from the first set (block 314). These steps are generally consistent with those as discussed with reference to the embodiment 100 herein. The selected second set of solutions is subdivided into a plurality of sub-sets or clusters (block 315). Different invention embodiments may comprise specifying the number of clusters through input or through determination using such methods as hierarchical clustering methods or the minimal representation criterion, as generally discussed in "Model inference and pattern discovery," by J. Segen et al., Technical Report CMU-RI-TR-82-2, Carnegie Mellon University, Pittsburgh, Pa. (1981); herein incorporated by reference.

Recombination proceeds in each cluster separately and produces a number of new individuals, the "offspring" or third solution sets. Any recombination can be used, e.g. two-parent crossover of simple genetic algorithms, fitting and forward simulation with a probabilistic model for each of the plurality of subsets as is illustrated in FIG. 6 (block 316), or other method. When using a probabilistic model, steps of using models that range from the Bayesian optimization method to more sophisticated models as have been generally discussed herein may be comprised. By way of particular example, probabilistic models that practice chunking by merging a plurality of variables into a single variable and model relationships between the merged variables may be used.

The number of offspring produced by each subset cluster and thereby present in each of the plurality of third sets can be either proportional to its size or to its average fitness which introduces niching and assigns each cluster resources proportional to its overall quality. The offspring are then incorporated into at least a portion of the original population (block 320), possibly replacing the entire population. The embodiment 300 finishes when the termination criteria, which may for example be given by the user (e.g., convergence, maximum number of generations, etc.), are reached.

K-Means Clustering

Invention embodiments that comprise steps of niching were briefly discussed herein above with particular. It is now appropriate to discuss such invention embodiments in more detail. In particular, an invention embodiment that comprises steps of niching based on spatial separation comprises an optimization method embodiment that comprises steps of clustering. In a general sense, the pseudo-code of a clustering invention embodiment is as follows:

1) Randomly generate initial population P(0).
2) Select a set of promising strings S(t) from P(t).
3) Cluster S(t) into k clusters $C_i(t)$.
4) Process each cluster $C_i(t)$ separately to generate its offspring $O_i(t)$.
5) Create a new population P(t+1) by replacing some strings from P(t) with $O_i(t)$.
6) Set t=t+1.
7) If the termination criteria are not met, go to 2).

One particular method for clustering has proven to be of utility in practice of invention embodiments: k-means clustering. In k-means clustering, each cluster is specified by its center. Initially, k centers (where k is given) are generated at random. Each point is assigned to its nearest center. Subsequently, each center is recalculated to be the mean of the points assigned to this center. The points are then reassigned to the nearest center and the process of recalculating the centers and reassigning the points is repeated until no points change their location after updating the centers. Sample clustering steps of one embodiment of k-means clustering useful in practice of the invention follows:

1) Generate k centers at random.
2) Assign each point to the nearest center.
3) Move each center to the mean of the points assigned to it.
4) If point locations have changed in step 2, go to 2.
5) Return the cluster centers and point locations.

To cluster binary strings, we can simply use real vectors of the same length to represent the center of each cluster. Euclidean metric can be used to measure distance. Other measuring methods can also be used, with an example comprising phenotypic distance can be used to cluster the population, which can be very useful on real-valued problems. In this case the centers can be also updated by computing frequency of each bit on each position and fixing each position of the genotype of the center to the most frequent value on this position. The value of the center would then be its phenotype. The distance metric used in the clustering steps is also a very important issue and for very complex problems this may lead to anomalous results. In general, the more similar the genotype metric is to its phenotype equivalent, the better the clustering should work.

The clusters can be also adjusted "on the fly" as the point locations are being updated which speeds up the computation slightly. The initialization of cluster centers can be improved by assigning each center to a randomly chosen point or the mean of a sample of points drawn randomly from the population that is to be clustered. In one example implementation we initialize each center to a randomly picked solution.

Those skilled in the art will appreciate that more sophisticated clustering methods can also be used within invention embodiments. K-means clustering, however, is advantageous in its simplicity. Although more sophisticated clustering methods may lead to better results, they will also entail disadvantageous use of greater resources.

Clustering embodiments of the present invention, including those that comprise performing steps of k-clustering, provide several advantages. For example, the negative effect of symmetry in a problem is alleviated, and the use of effective niching in optimization methods that use a probabilistic model is allowed. In the probabilistic modeling optimization methods such as the Bayesian optimization method, the use of traditional niching methods often fails to achieve the goal and results in a very poor performance when a problem has symmetry or multiple optima. Once niching can be incorporated into the optimization methods, it can be used to improve their performance on difficult combinatorial problems, solve hierarchical problems, and tackle multi-objective problems by thoroughly searching the solution space for a diverse Pareto front.

Figure 7:
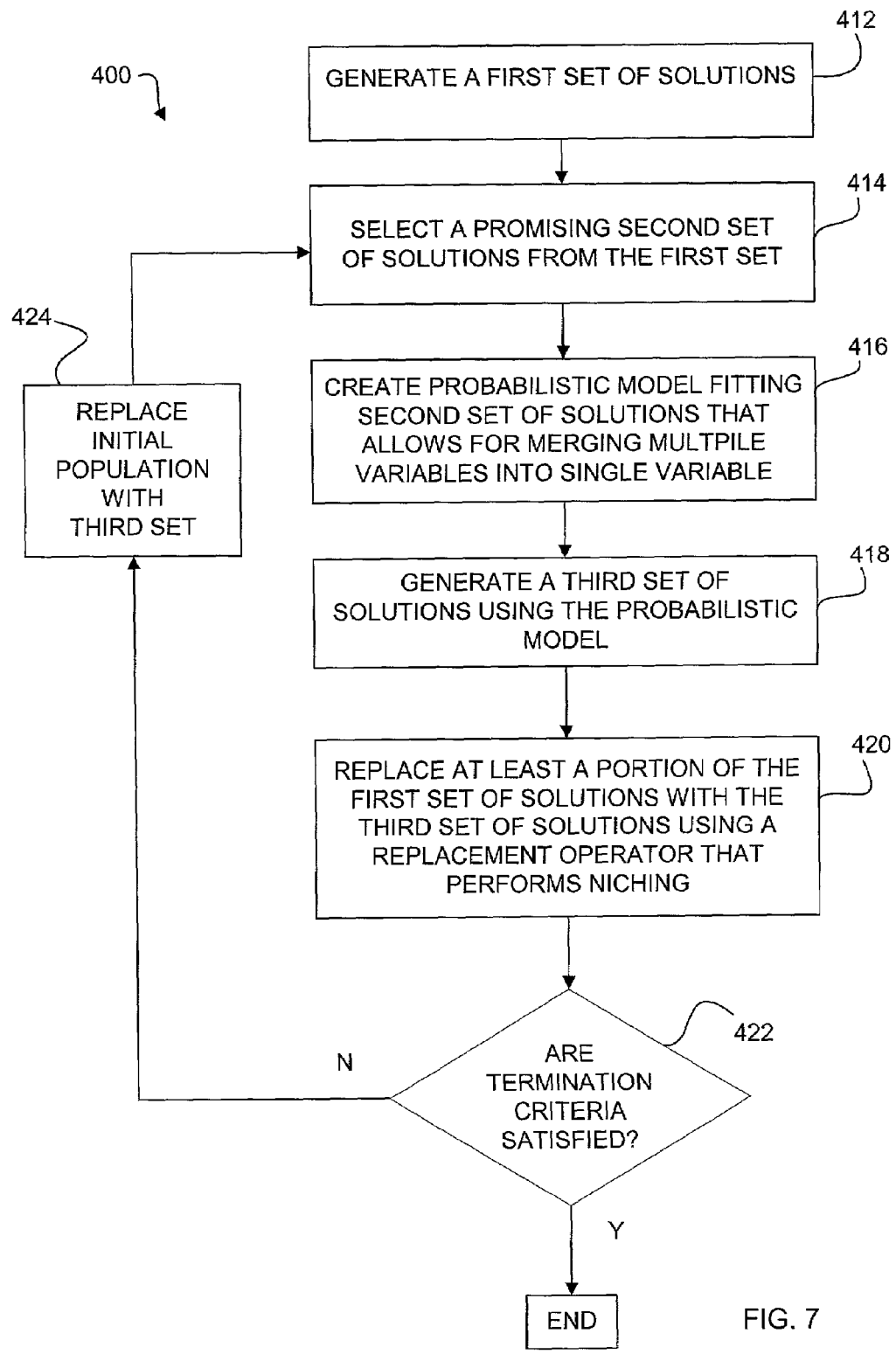
FIG. 7 is a flowchart illustrating the general steps of an additional example embodiment of the invention that comprises steps of niching and chunking.

It will be understood that additional embodiments of the invention may comprise combinations of steps of the individual embodiments that have been discussed herein. By way of example, the flowchart of FIG. 7 illustrates an invention embodiment 400 that comprises a step of creating a probabilistic model that allows for merging multiple variables into a single variable (e.g., chunking) (block 416), as well as a step of performing replacement using an operator that performs niching (block 420). By way of more particular example, the embodiment 400 may comprise steps of creating a Huffman network and using the network to generate a third set of solutions (blocks 416–418) as well as a step of replacing at least a portion of the first solution set with the third set of solutions using a restricted tournament selection operator (block 420). Other particular steps of niching and/or chunking may likewise be combined in an invention embodiment.

Indeed, it will be appreciated that embodiments such as the embodiment 400 that practice niching in combination with chunking generally provide advantages over invention embodiments that practice only chunking or only niching. In this respect, embodiments such as the embodiment 400 may be preferred for use with highly complex hierarchical problems where rich problem learning capabilities are desirable.

It will also be understood that the embodiments shown and discussed herein are illustrative of the best known modes for practicing the invention only. Many additional embodiments will be of utility. By way of example, other invention embodiments may comprise the steps of the invention embodiments discussed herein in a different sequence than has been illustrated. By way of additional example, steps of niching may be separated from the steps of replacement and or selection. Further, the individual steps of any particular embodiment discussed herein may be practiced in other invention embodiments as may be practical or desirable.

Further, embodiments of the invention may be combined with other search methods or steps. In particular, hybrid methods that extend the present invention may be comprised that use local search mechanisms (or other search methods) for evaluation or local improvement of the solutions. The local search could be run on some part of the population in each generation (for example, 50%) at various times during the optimization method. In this manner, solution sets may be further refined as desired.

Those skilled in the art will also appreciate that the present invention may have far reaching and widely varying applications. Generally, it may be of utility in any application where a solution to a problem is to be arrived at. By way of brief example only, example applications may include operations research, artificial and computational intelligence, expert systems, fuzzy systems, soft computing, neural networks, numerical computing, DNA and molecular computing, and artificial life.

Those knowledgeable in the art will also appreciate that the present invention is well suited for practice in the form of a computer program product, and accordingly that the present invention may comprise computer program product embodiments. Indeed, it will be appreciated that the relatively intense calculational nature and manipulation of data that steps of invention embodiments comprise suggest that practice in the form of a computer program product will be advantageous. These program product embodiments may comprise computer executable instructions embedded in a computer readable medium that when executed by a computer cause the computer to carry out various steps. The executable instructions may comprise computer program language instructions that have been compiled into a machine-readable format. The computer readable medium may comprise, by way of example, a magnetic, optical, or circuitry medium useful for storing data. Also, it will be appreciated that the term "computer" as used herein is intended to broadly refer to any machine capable of reading and executing recorded instructions.

The steps performed by the computer upon execution of the instructions may generally be considered to be steps of method embodiments of the invention. That is, as discussed herein it will be understood that method embodiment steps may likewise comprise program product steps. With reference to the flowcharts of FIGS. 1 and 5–7 by way of example, it will be appreciated that the invention embodiments illustrated may comprise a method embodiment or a computer program embodiment. It will also be appreciated that the steps of these embodiments may be changed or eliminated as may be appropriate for practice with a computer. For example, a computer program product invention embodiment may not comprise a step of generating a first solution set, but may instead receive a first solution set as user provided input or otherwise query a source for the first solution set.

When practicing the invention in the format of a computer program product, it may be desirable to additionally practice a step of parallelization through using a plurality of computers to execute the program steps. By way of example, the first solution set could be distributed to the memory of first and second computers for individual processing. Or, the steps of model creation and generation of third solution sets could be executed by a plurality of computers to speed optimization. By way of still further example, the program product steps could be simulated on multiple computers with the computers in communication with one another to perform steps of exchange and/or supply of solution set members in some desired or random pattern. Any desired form of topology, migration rate, numbers of computers, and process exchange rules could be practiced.

The present invention thereby solves many otherwise unresolved problems in the art. For example, through steps of chunking and/or niching, embodiments of the present invention provide a level of linkage learning that has heretofore not been achieved. Difficult hierarchical problems that are intractable by other optimization methods are able to be solved in an efficient manner. Experiments run using various invention embodiments have shown these embodiments to be able to effectively solve complex problems that decompose over a hierarchical structure over a plurality of levels.

It is intended that the specific embodiments and configurations herein disclosed are illustrative of the preferred and best modes for practicing the invention, and should not be interpreted as limitations on the scope of the invention as defined by the appended claims.

What is claimed is:

1. A method for optimizing a solution set for a problem comprising the sequential steps of:
   a) generating a first set of solutions comprising a plurality of members;
   b) creating a second set of solutions using a selection operator to select members from said first set of solutions;
   c) fitting said second set of solutions with a probabilistic model, said probabilistic model allowing for multiple variables to be merged together to form a single new variable whereby hierarchically decomposable problems can be modeled;
   d) using said model to generate a third set of solutions; and,
   e) replacing at least a portion of said first set of solutions with said third set of solutions to create a new solution set.

2. A method for optimizing a solution set as in claim 1 wherein the step of fitting said second set of solutions with said probabilistic model comprises creating a plurality of models that fit said second set of solutions, selecting one model from said plurality of models, and using said one model to create said third set of solutions.

3. A method for optimizing a solution set as in claim 2 wherein the step of selecting one model comprises using a scoring metric to score each of said models and searching said scored models to determine the highest scoring of said plurality of models.

4. A method for optimizing a solution set as in claim 3 wherein said scoring metric is chosen from the group of scoring metrics consisting of a minimum description length metric, and the Bayesian-Dirichlet metric; and wherein the step of searching all of said scored networks comprises using a search method chosen from the group consisting of a greedy algorithm method, a local hill climbing method, a gradient search, a tabu search, and a simulated annealing method.

5. A method for optimizing a solution set as in claim 2 wherein the step of selecting one model comprises comparing said plurality of models through a binary relation to define a better than relation between said models.

6. A method for optimizing a solution set as in claim 1 wherein the step of fitting said second solution set with a probabilistic model comprises creating a model that models dependencies, independencies, conditional dependencies, and conditional independencies on a plurality of hierarchical levels between at least a portion of said merged variables.

7. A method for optimizing a solution set as in claim 1 wherein the step of fitting said second solution set with a probabilistic model comprises creating one or more models chosen from the group consisting of Bayesian networks with local structures, and Huffman networks.

8. A method for optimizing a solution set as in claim 1 wherein the step of fitting said second solution set with a probabilistic model comprises creating a probabilistic model that utilizes local structures to represent conditional probabilities between variables.

9. A method for optimizing a solution set as in claim 1 wherein the step of fitting said second solution set with a probabilistic model comprises creating a Bayesian network model comprising one or more features to model a hierarchal problem decomposition, said one or more features selected from the group consisting of local structures, hidden variables, and histograms.

10. A method for optimizing a solution set as in claim 1 wherein the step of fitting said second set of solutions with a probabilistic model comprises creating a Bayesian network model comprising local structures selected from the group consisting of default tables, decision trees, and decision graphs.

11. A method for optimizing a solution set as in claim 1 wherein the step of fitting said second solution set with a probabilistic model comprises building a network to model a probability distribution of said second set of solutions, said network representing a plurality of merged variables as a single variable, said network representing dependencies and independencies between at least a portion of said merged variables over a plurality of hierarchical levels.

12. A method as in claim 11 wherein the step of building said network comprises building said network using a scoring metric and a search method to optimize said network.

13. A method for optimizing a solution set as in claim 1 wherein the step of fitting said second solution set with a probabilistic model comprises generating a plurality of probabilistic models fitting said second set of solutions, each of said models allowing for multiple variables to be merged together to form a single new variable whereby hierarchically decomposable problems can be modeled; and wherein the step of using said probabilistic model to generate a third set of solutions comprises using each of said plurality of models to generate a portion of said third set of solutions.

14. A method for optimizing a solution set as in claim 13, wherein the method further comprises the step of using a first of said plurality of models to generate a selected percentage of said third set of solutions, and using a second of said plurality of solutions to generate a selected percentage of said third set of solutions.

15. A method for optimizing a solution set as in claim 1 wherein the method further comprises a step of performing niching to preserve diversity of solutions.

16. A method for optimizing a solution set as in claim 1 wherein said selection operator provides for niching to preserve diversity among said members of said second set.

17. A method for optimizing a solution set as in claim 1 wherein said selection operator comprises a restricted tournament selection operator.

18. A method for optimizing a solution set as in claim 1 wherein said selection operator comprises one or more operators selected from the group consisting of a tournament selection operator, a truncation selection operator, a fitness selection operator, a preselection operator, a crowding selection operator, a clustering selection operator, a lambda-mu selection operator, and a Boltzmann selection operator.

19. A method for optimizing a solution set as in claim 1 wherein the step of replacing at least a portion of said first solution set with said third solution set further comprises replacing at least a portion of said first solution set with said third solution set using a replacement operator that provides for niching.

20. A method for optimizing a solution set as in claim 19 wherein said replacement operator performs niching using a niching method selected from the group of methods consisting of tournament replacement and crowding.

21. A method for optimizing a solution set as in claim 20 wherein said replacement operator comprises restricted tournament replacement.

22. A method for optimizing a solution set as in claim 1 wherein the step of replacing at least a portion of said first set of solutions comprises performing niching to preserve diversity of said solutions through the steps of:
  subdividing said first set of solutions into a plurality of sub-sets;
  comparing one of said third set of solutions with members of one of said sub-sets; and
  replacing one of said members of said sub-sets with said one of said third set of solutions if said one of said third solution set is superior to said members of said one of said sub-sets.

23. A method for optimizing a solution set as in claim 22 wherein each of said sub-sets have between 15–25 members.

24. A method for optimizing a solution set as in claim 22 wherein each of said sub-sets have a number of members greater than 25 and proportional to the size of the problem being solved.

25. A method for optimizing a solution set as in claim 1 wherein the step of creating a second set of solutions from said first set of solutions comprises creating a plurality of second sets of solutions, wherein the step of fitting said second set of solutions with a probabilistic model comprises fitting each of said plurality of second sets of solutions with a probabilistic, wherein the step of using said model to generate a third set of solutions comprises using each of said probabilistic models to generate a plurality of third sets of solutions, and wherein the step of replacing at least a portion of said first set of solutions with said third set comprises replacing at least a portion of said first set with each of said third sets of solutions.

26. A method for optimizing a solution set as in claim 1 wherein the method further comprises a step of:
evaluating said new solution set to determine if completion criteria are satisfied, and if said completion criteria are not satisfied replacing said first set of solutions with said new set of solutions and repeating the steps of b) through e) until said completion criteria are satisfied.

27. A method for optimizing a solution set as in claim 1 wherein the step of using a selection operator to create a second set of solutions from said first set further comprises using a fitness function to determine a fitness for each of said members, and wherein said selection operator selects members having a high fitness.

28. A method for optimizing a solution set as in claim 27 wherein said fitness function comprises one or more fitness functions selected from the group consisting of a co-evolved fitness function, a multi-objective fitness function, a multimodal fitness function, an interactive fitness function, an approximate fitness function, a simulation fitness function, and an execution fitness function.

29. A method for optimizing a solution set as in claim 1 wherein the step of generating a first set of solutions comprises generating said first set of solutions using a probability distribution biased by prior knowledge.

30. A method for optimizing a solution set as in claim 1 wherein said members of said first solution set are coded in a format selected from the group consisting of fixed and variable length strings.

31. A method for optimizing a solution set as in claim 30 wherein said members of said first solution set are in a format that comprises one or more formats selected from the group consisting of: binary code, k-ary code, floating point code, alphanumeric code, real vectors, logical expressions, program codes, images, random keys, and rules.

32. A method for optimizing a solution set as in claim 1 wherein the method further comprises the preliminary step of converting data into said first solution set.

33. A method for optimizing a solution set for a problem comprising the steps of:
generating a first set of solutions comprising a plurality of members;
creating a second set of solutions by selecting a sub-set of members from said first set of solutions;
fitting said second set of solutions with a probabilistic model;
using said model to generate a third set of solutions; and,
replacing at least a portion of said first set of solutions with said third set of solutions to create a new solution set, said replacing comprising niching to preserve diversity among members of said new solution set.

34. A method for optimizing a solution set as in claim 33 wherein the step of replacing at least a portion of said first set of solutions with said third set with niching is performed using one or more operators chosen from the group consisting of a tournament operator, a crowding operator, a pre-selection operator, a clustering operator, and a fitness sharing operator.

35. A method for optimizing a solution set as in claim 33 wherein the step of replacing at least a portion of said first set of solutions with niching comprises the steps of:
subdividing said first set of solutions into a plurality of sub-sets;
comparing one of said third set of solutions with members of one of said sub-sets; and
replacing one of said members of said sub-sets with said one of said third set of solutions if said one of said third solution set is superior to said members of said one of said sub-sets.

36. A method for optimizing a solution set as in claim 33 wherein each of said sub-sets have between 15–25 members.

37. A method for optimizing a solution set as in claim 33 wherein the step of creating a second set of solutions comprises using a selection operator to select members from said first solution set, said selection operator comprises one or more operators chosen from the group consisting of a tournament selection operator, a crowding operator, a pre-selection operator, a clustering operator, and a fitness sharing operator.

38. A method for optimizing a solution set for a problem comprising the sequential steps of:
a) generating a first set of solutions comprising a plurality of members;
b) creating a second set of solutions using a selection operator to select a second set of members from said first set of solutions, said selection operator using a fitness function to evaluate said members of said first set, said second set of members having a high fitness;
c) building a network to model a probability distribution of said second set of solutions, said network representing a plurality of merged variables as a single variable, said network representing dependencies and independencies between at least two of said merged variables over a plurality of hierarchical levels;
d) using said model to generate a third set of solutions;
e) replacing at least a portion of said first set of solutions with said third set of solutions to create a new solution set, said replacing comprising niching to preserve diversity among members of said new solution set; and
f) evaluating said new solution set to determine if completion criteria have been satisfied, and if said completion criteria are not satisfied replacing said first set of solutions with said new set of solutions and repeating the steps of b) through e) until said completion criteria are satisfied.

39. A computer program product for optimizing a solution set, the program product comprising computer executable instructions stored on a computer readable medium that when executed by a computer cause the computer to:
a) create a second set of solutions using a selection operator to select members from a first set of solutions;
b) build a probabilistic model fining said second set of solutions, said probabilistic model allowing for multiple variables to be merged together to form a single new variable, and said model allowing for relationships to be modeled between at least a portion of said single new variables over a plurality of hierarchical levels;
c) using said model to generate a third set of solutions;
d) replacing at least a portion of said first set of solutions with said third set of solutions to create a new solution set; and,
e) evaluating said third set of solutions to determine if completion criteria have been satisfied.

40. A computer program product as in claim 39, wherein the program instructions when executed to cause the computer to build said probabilistic model cause the computer to build a Bayesian network that comprises local structures to model dependencies and independencies between at least a portion of said merged variables.

41. A computer program product as in claim 39 wherein the program instructions when executed further cause the computer to communicate with at least a second computer, and to cause the at least a second computer to execute one or more of the program product instructions.

42. A computer program product as in claim 41 wherein the program instructions when executed cause the computer to communicate at least a portion of said first set of solutions to the second computer for processing by the second computer.

43. A computer program product as in claim 39 wherein the program instructions when executed cause the computer to communicate with the second computer to communicate instructions to the second computer for building at least a portion of said probabilistic model.

44. A computer program product as in claim 39 wherein the program instructions when executed further cause the computer to replace at least a portion of said first set of solutions with said third set of solutions using a niching method to preserve diversity of solutions in said new solution set.

45. A computer program product for optimizing a solution set, the program product comprising computer executable instructions stored on a computer readable medium that when executed by a computer cause the computer to:
 a) create a second set of solutions using a selection operator that selects members from a first set of solutions;
 b) build a probabilistic model that fits said second set of solutions;
 c) use said model to generate a third set of solutions;
 d) replace at least a portion of said first set of solutions with said third set of solutions to create a new solution set using niching to preserve diversity among said new solution set;
 e) evaluate said third set of solutions to determine if completion criteria have been satisfied, and if said completion criteria have not been satisfied to replace said first set of solutions with said new set and to repeat steps a)–e).

46. A computer program product as in claim 45 wherein the program instructions when executed cause the computer to replace at least a portion of said first set of solutions with niching further causes the computer to:
 subdivide said first set of solutions into a plurality of sub-sets;
 compare one of said third set of solutions with members of one of said sub-sets; and
 replace one of said members of said sub-sets with said one of said third set of solutions if said one of said third solution set is superior to said members of said one of said sub-sets.

* * * * *